US012142833B2

(12) United States Patent
Harless

(10) Patent No.: US 12,142,833 B2
(45) Date of Patent: Nov. 12, 2024

(54) SCISSORS RADIAL DEPLOYABLE ANTENNA REFLECTOR STRUCTURE

(71) Applicant: Eagle Technology, LLC, Melbourne, FL (US)

(72) Inventor: Richard I. Harless, Melbourne, FL (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 63 days.

(21) Appl. No.: 18/052,987

(22) Filed: Nov. 7, 2022

(65) Prior Publication Data

US 2024/0154317 A1 May 9, 2024

(51) Int. Cl.
*H01Q 15/16* (2006.01)
*H01Q 19/12* (2006.01)
*H01Q 19/13* (2006.01)

(52) U.S. Cl.
CPC ........... *H01Q 15/161* (2013.01); *H01Q 19/12* (2013.01); *H01Q 19/132* (2013.01)

(58) Field of Classification Search
CPC ..... H01Q 15/161; H01Q 19/12; H01Q 19/132
See application file for complete search history.

(56) References Cited

U.S. PATENT DOCUMENTS 3,375,624 A 4/1968 Auvray
3,496,687 A * 2/1970 Greenberg ............ E01D 15/124 343/915
3,509,576 A * 4/1970 McLain ............... H01Q 15/161 343/915
3,631,505 A * 12/1971 Carman ............... H01Q 15/161 343/915
4,769,647 A 9/1988 Herbig et al.
5,680,145 A 10/1997 Thomson et al.
(Continued)

FOREIGN PATENT DOCUMENTS

JP S-60242704 A * 12/1985
RU 2266592 C1 * 12/2005

OTHER PUBLICATIONS

Zhao et al., "Novel Surface Design of Deployable Reflector Antenna Based on Polar Scissor Structures," Chinese Journal of Mechanical Engineering, vol. 33, No. 1, 15 pages (2020).
(Continued)

*Primary Examiner* — Dameon E Levi
*Assistant Examiner* — Leah Rosenberg
(74) *Attorney, Agent, or Firm* — Fox Rothschild LLP; Carol Thorstad-Forsyth

(57) ABSTRACT

Systems and methods for operating a deployable reflector system. The methods comprising: causing a proximal end of a first link element (LE) located at a first end of a scissoring rib assembly (SRA) to slidingly engage a hub; allowing a proximal end of a second LE of SRA to pivot relative to the hub so as to cause scissor motion of SRA while the first LE is slidingly engaging the hub; causing a distal end of a third LE located at a second end of SRA to pivot relative to the edge member during the scissor motion of SA; allowing the edge member to slidingly engage a fourth LE located at the second end of SRA during pivotal motion of the third LE; and using the edge member to cause vertical movement of a peripheral edge of a reflector relative to the hub while the edge member slidingly engages the fourth LE.

10 Claims, 17 Drawing Sheets

(56) References Cited

U.S. PATENT DOCUMENTS

| | | | | |
|---|---|---|---|---|
| 5,857,648 | A * | 1/1999 | Dailey | B64G 1/22 244/172.6 |
| 6,313,811 | B1 | 11/2001 | Harless | |
| 8,654,033 | B2 | 2/2014 | Sorrell et al. | |
| 10,256,530 | B2 | 4/2019 | Freebury et al. | |
| 10,516,216 | B2 | 12/2019 | Harless et al. | |
| 10,707,552 | B2 | 7/2020 | Harless | |
| 2020/0067168 | A1* | 2/2020 | Harless | H01Q 1/1235 |
| 2022/0181787 | A1* | 6/2022 | Taylor | H01Q 1/288 |

OTHER PUBLICATIONS

Extended European Search Report issued on Mar. 27, 2024 in EP23207661.2.

* cited by examiner

SCISSORS RADIAL DEPLOYABLE ANTENNA REFLECTOR STRUCTURE

BACKGROUND

Statement of the Technical Field

This document relates to compact antenna system structures. More particularly, this document relates to a scissors radial deployable antenna reflector structure.

DESCRIPTION OF THE RELATED ART

Various conventional antenna structures exist that include a reflector for directing energy into a desired pattern. One such conventional antenna structure is a radial rib reflector design comprising a plurality of reflector ribs joined together at a common cylindrical shaped hub. The reflector ribs provide structural support to a flexible antenna reflector surface attached thereto. A plurality of cords, wires, guidelines, or other tensile members couple the flexible antenna reflector surface to the reflector ribs. The wires or guidelines define and maintain the shape of the flexible antenna reflector surface. The radial rib reflector is collapsible so that it can be transitioned from a deployed position to a stowed position. In the deployed position, the radial rib reflector has a generally parabolic shape. In the stowed position, the reflector ribs are folded up against each other. As a result, the antenna reflector has a stowed height approximately equal to the reflector's radius.

Another conventional antenna structure is a folding rib reflector having a similar design to the radial rib reflector design described above. However, the reflector ribs include a first rib tube and second rib tube joined together by a common joint. In the stowed position, the first rib tubes are folded up against the second rib tubes. As such, the antenna reflector has a stowed height that is approximately half the stowed height of the radial rib reflector design. However, the stowed diameter of the folding rib reflector may be larger than the stowed diameter of the radial rib reflector design.

Another type of configuration is a hoop reflector where the reflector surface is attached to a circular hoop. In a hoop-type reflector, the hoop structure must have a certain amount of stiffness to prevent the hoop from warping. Typical of this design is U.S. Pat. No. 5,680,145. In this patent, the hoop consists of two rings, an upper and a lower. Both rings are made up of tube elements. As such, the single tube elements provide minimal bending stiffness, or ring stiffness, about the longitudinal axis of symmetry defined as the direction perpendicular to the circle defining the perimeter of the hoop. The limited ring stiffness allows the hoop to become non-circular and is easily deformed into an oval shape. Other hoop designs provide significant ring stiffness by creating a toroidal hoop with a triangular configuration of members. For example, such an arrangement is disclosed in U.S. Pat. No. 6,313,811. To shape the reflector into a parabolic surface, the hoop must also have a deployed thickness perpendicular to the plane defined by the perimeter of the hoop. The thickness of the hoop is measured in the direction of a central axis of the hoop when deployed. Moreover, this thickness must generally be greater than the depth of the parabolic surface in order to achieve a desired parabolic shape. The required out of plane thickness of the hoop and the need for bending stiffness can make it challenging to design a hoop structure which, when stowed, is sufficiently compact in length along the longitudinal direction defined by the hoop central axis. For example, a conventional hoop system (described in U.S. Pat. No. 5,680,145 to Thomson et al.) has a sufficiently rigid hoop structure with a deployed thickness H can, when collapsed for stowage aboard a spacecraft, have an elongated length along the hoop center axis equal to 2H.

SUMMARY

This document concerns system and methods for operating a deployable reflector system. The system comprises a plurality of scissoring rib assemblies. Each scissoring rib assembly has a first end coupled to a hub and a second end coupled to an edge member. The methods comprise: causing a proximal end of a first link element located at the first end of the scissoring rib assembly to slidingly engage the hub; allowing a proximal end of a second link element located at the first end of the scissoring rib assembly to pivot relative to the hub so as to cause scissor motion of the scissoring rib assembly while the first link element is slidingly engaging the hub; causing a distal end of a third link element located at the second end of the scissoring rib assembly to pivot relative to the edge member during the scissor motion of the scissoring rib assembly; allowing the edge member to slidingly engage a fourth link element located at the second end of the scissoring rib assembly during pivotal motion of the third link element; and/or using the edge member to cause vertical movement of a peripheral edge of a reflector relative to the hub while the edge member slidingly engages the fourth link element.

Expansion of the scissoring rib assembly and vertical movement of the peripheral edge of the reflector provides an antenna reflector surface with a curved shape. The antenna reflector surface is held taut when the scissoring rib assembly is in an expanded condition.

A first distance between the proximal end of a first link element (e.g., in the section attached to the hub) and the proximal end of the second link element (e.g., in this section attached to the hub) (i) decreases as the scissoring rib assembly transitions from a collapsed condition to an expanded condition and (ii) increases as the scissoring rib assembly transitions from the expanded condition to the collapsed condition. A second distance between the distal end of the third link element and a distal end of the fourth link element (i) decreases as the scissoring rib assembly transitions from the collapsed condition to the expanded condition and (ii) increases as the scissoring rib assembly transitions from the expanded condition to the collapsed condition. A distance between an end of the edge member which is coupled to the reflector and an end of the hub which is closest to the reflector is (i) increased as the scissoring rib assembly transitions from the collapsed condition to the expanded condition and (ii) decreased as the scissoring rib assembly transitions from the expanded condition to the collapsed condition.

The reflector surface may be structurally supported using a circumferential hoop at least partially defined by the edge member and a plurality of cords. The cords extend between the edge member of the scissoring rib assembly and an edge member of at least one other scissoring rib assembly. Additionally or alternatively, expansion of the scissoring rib assembly may be restrained using a plurality of cords coupled between the hub and the scissoring rib assembly. The cords comprise at least one tower cord coupled between the hub and the edge member, and/or at least one scissor hinge cord coupled between the hub and a hinge of the scissoring rib assembly.

The present document also concerns a deployable reflector system. The system comprises: a hub; edge member(s); scissoring rib assembly(ies) having a first end coupled to the hub and a second end coupled to the edge member; a reflector surface secured to the edge member(s) and expandable to a shape that is configured to concentrate RF energy in a desired pattern; and an actuator disposed at the hub and configured to cause scissor motion of the scissoring rib assembly(ies). Each scissoring rib assembly comprises: a first link element with a proximal end that slidingly engages the hub; a second link element with a proximal end pivotally coupled to the hub (where pivotal movement of the second link element is caused by sliding movement of the first link element relative to the hub); a third link element with a distal end pivotally coupled to the edge member (where), pivotal movement of the third link element occurs at least during the scissor motion of the scissoring rib assembly); and a fourth link element that slidingly engages the edge member during pivotal motion of the third link element. While the edge member slidingly engages the fourth link element, the edge member causes vertical movement of a peripheral edge of the reflector surface relative to the hub.

Expansion of the scissoring rib assembly and vertical movement of the peripheral edge of the reflector surface may provide the reflector surface with a curved shape. The reflector surface is held taut when the scissoring rib assembly is in an expanded condition. A first distance between the proximal end of a first link element and the proximal end of the second link element (i) decreases as the scissoring rib assembly transitions from a collapsed condition to an expanded condition and (ii) increases as the scissoring rib assembly transitions from the expanded condition to the collapsed condition. A second distance between the distal end of the third link element and a distal end of the fourth link element (i) decreases as the at least one scissoring rib assembly transitions from the collapsed condition to the expanded condition and (ii) increases as the scissoring rib assembly transitions from the expanded condition to the collapsed condition. A distance between an end of the edge member which is coupled to the reflector surface and an end of the hub which is closest to the reflector surface is increased as the scissoring rib assembly transitions from the collapsed condition to the expanded condition.

The deployable reflector system may also comprise a circumferential hoop configured to structurally support the reflector surface when the deployable reflector system is in deployed condition. The circumferential hoop is at least partially defined by the edge member and a plurality of cords extending between the edge member of the scissoring rib assembly and an edge member of at least one other scissoring rib assembly.

The deployable reflector system may additionally or alternatively comprise a plurality of cords to restrain expansion of the at least one scissoring rib assembly. The cords are coupled between the hub and the scissoring rib assembly (ies). The cords may comprise tower cord(s) coupled between the hub and the edge member(s) and/or scissor hinge cord(s) coupled between the hub and hinge(s) of the scissoring rib assembly(ies).

BRIEF DESCRIPTION OF THE DRAWINGS

This disclosure is facilitated by reference to the following drawing figures, in which like numerals represent like items throughout the figures.

DETAILED DESCRIPTION

Figure 1:
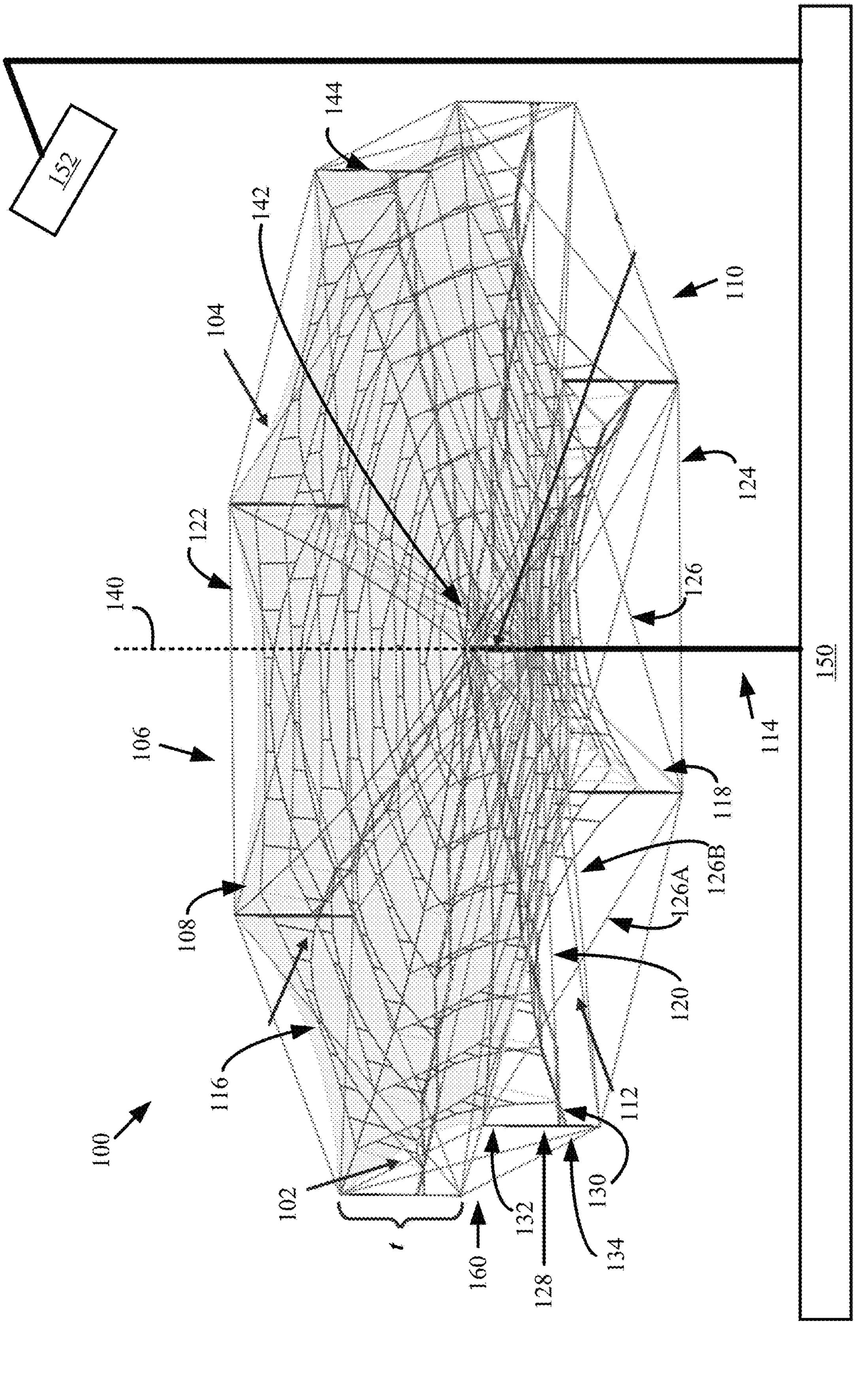
FIG. 1 is a perspective view of a reflector system in a deployed position.

It will be readily understood that the components of the systems and/or methods as generally described herein and illustrated in the appended figures could be arranged and designed in a wide variety of different configurations. Thus, the following more detailed description, as represented in the figures, is not intended to limit the scope of the present disclosure, but is merely representative of certain implementations in various different scenarios. While the various aspects are presented in the drawings, the drawings are not necessarily drawn to scale unless specifically indicated.

This document generally concerns systems (e.g., system 100 of FIG. 1) and methods (e.g., method 1500 of FIG. 15) for operating a deployable reflector system. The system comprises a plurality of scissoring rib assemblies (e.g., scissoring rib assemblies 102 of FIG. 1), radiating outward from a central hub (e.g., hub 114 of FIG. 1) where the distal tips of the scissoring rib assemblies form a circular or elliptical shape. Each scissoring rib assembly consists of one or more sections consisting of a pair of links (e.g., links 802 of FIG. 8) that pivot about a common point that is located near a midpoint of each link. To facilitate the folding nature of the system, one of the links may employ a pair of elements so that the other link can nestle between the pair when in the closed position. Each section is connected to its neighboring sections at the proximal and distal ends of each link. Sections connect in series with the first second uniquely connecting to the central hub at its proximal link ends and its distal ends connecting to the proximal link ends of its neighbor. This neighboring section in turn connects its distal link ends to the proximal ends of the next section and so forth until the last, most outboard section is attached. The last section at the edge or distal tip of the scissoring rib assembly uniquely attaches to an edge member (e.g., edge member 128 of FIG. 1). Nominally, the edge member is oriented vertically, where the vertical direction aligns with the axis of the central hub. However, the edge member can be oriented at an angle with respect to the vertical direction. The number of sections is at least one, most configurations include several.

Figure 17:
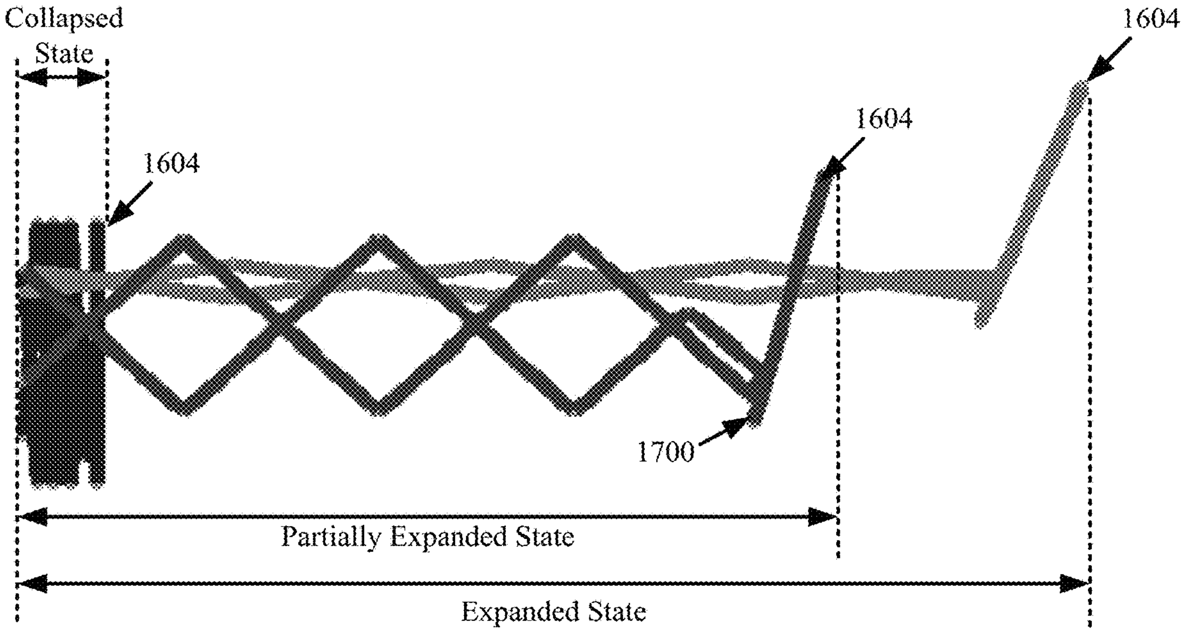

Both the distal and proximal ends of each link implement pivoting joints (e.g., pivoting joint 1700 of FIG. 17) making the scissoring rib assembly deployable. Combining these joints with the pivot near the middle of each link permits the whole scissoring rib assembly to radially expand or contract by the sliding nature of the one of the links in the section uniquely attaching to the central hub. The method may comprise: causing the proximal end of one of the links in the uniquely attached first section to slidingly engage the hub; allowing the proximal end of the other non-sliding link to rotate; causing the junction near the middle of the link pair of this first section to move radially and vertically; causing the links themselves to rotate; causing distal ends of the links in this first, hub attached section, to cause the proximal link ends of its neighboring section to move in a similar manner, both radially and vertically; causing in concert all sections to move their links, proximal and distal ends to move radially and vertically; causing the distal ends of the links in the last section uniquely attaching to the edge member to move vertically with respect to one another. The distal end of one of the links in this last section attaches to the edge member in a slidingly manner while the distal end of the other link in the last section attaches to the edge member with a pivot. The vertical motion of the tips of the last section and sliding nature of the attachment to the edge member causes the edge member to advantageously move in the vertical direction as well moving the tip of the whole rib assembly in the radial direction, creating a deployable scissoring rib assembly.

Expansion of the scissoring rib assembly and vertical movement of the peripheral edge of the reflector provides an antenna reflector surface (e.g., reflector surface 108 of FIG. 1) with a curved shape. The antenna reflector surface is held taut when the scissoring rib assembly is in an expanded condition.

A first distance between the proximal end of a first link element in the section uniquely attached to the hub and the proximal end of the other link element in this first, hub attached section (i) decreases as the scissoring rib assembly transitions from a collapsed condition to an expanded condition and (ii) increases as the scissoring rib assembly transitions from the expanded condition to the collapsed condition. A second distance between the distal end of one link element in the last section attaching to the edge member and a distal end of the other link element in this same last section (i) decreases as the scissoring rib assembly transitions from the collapsed condition to the expanded condition and (ii) increases as the scissoring rib assembly transitions from the expanded condition to the collapsed condition. A distance between one end of the edge member at the periphery of the reflector assembly which is coupled to the reflector surface and an end of the hub which is closest to the reflector surface is (i) increased as the scissoring rib assembly transitions from the collapsed condition to the expanded condition and (ii) decreased as the scissoring rib assembly transitions from the expanded condition to the collapsed condition.

The reflector surface may be structurally supported using a circumferential hoop at least partially defined by the edge member and a plurality of cords. The cords extend between the edge member of the scissoring rib assembly and an edge member of at least one other scissoring rib assembly. Additionally, or alternatively, expansion of the scissoring rib assembly may be restrained using a plurality of cords coupled between the hub and the scissoring rib assembly. The cords comprise at least one tower cord coupled between the hub and the rib, and/or at least one scissor hinge cord coupled between the hub and a hinge of the scissoring rib assembly.

The present document also concerns a deployable reflector system. The system comprises three or more scissoring rib assemblies, radiating outward from a central hub where the distal tips of the rib assemblies form a circular or elliptical shape; a reflector surface secured to the scissoring rib assembly(ies) and expandable to a shape that is configured to concentrate RF energy in a desired pattern and an actuator disposed at the hub and configured to cause scissor motion of the scissoring rib assembly(ies). Each scissoring rib consists of one or more sections, each section consisting of a pair of links that pivot about common point, located near the midpoint of each link. To facilitate the folding nature of the system, one of the links may employ a pair of elements so that the other link can nestle between the pair when in the closed position. Each section is connected to its neighboring sections at the proximal and distal ends of each link. Sections connect in series with the first section uniquely connecting to the central hub at its proximal link ends and its distal ends connecting to the proximal link ends of its neighbor. This neighboring section in turn connects its distal link ends to the proximal ends of the next section and so forth until the last, most outboard section is attached. The last section at the edge or distal tip of the scissoring rib assembly uniquely attaches to an edge member. Nominally, the edge member is oriented vertically, where the vertical direction aligns with the axis of the central hub however, the edge member can be oriented at an angle with respect to the vertical direction. The number of sections is at least one, most configurations include several.

Both the distal and proximal ends of each link implement pivoting joints making the scissoring rib deployable. Combining these joints with the pivot near the middle of each link permits the whole scissoring rib assembly to radially expand or contract by the sliding nature of the one of the links in the section uniquely attaching to the central hub. The method comprises causing the proximal end of one of the links in the uniquely attached first section to slidingly engage the hub; allowing the proximal end of the other non-sliding link to rotate; causing the junction near the middle of the link pair of this first section to move radially and vertically; causing the links themselves to rotate; causing distal ends of the links in this first, hub attached section, to cause the proximal link ends of its neighboring section to move in a similar manner, both radially and vertically; causing in concert all sections to move their links, proximal and distal ends to move radially and vertically; causing the distal ends of the links in the last section attaching to the edge member to move vertically with respect to one another. The distal end of one of the links in this last section attaches to the edge member in a slidingly manner while the distal end of the other link in the last section attaches to the edge member with a pivot. The vertical motion of the tips of the last section and sliding nature of the attachment to the edge member causes the edge member to advantageously move in the vertical direction as well moving the tip of the whole rib assembly in the radial direction, creating a deployable scissoring rib assembly.

Expansion of the scissoring rib assembly and vertical movement of the peripheral edge of the reflector surface may provide the reflector surface with a curved shape. The reflector surface is held taut when the scissoring rib assembly is in an expanded condition. A first distance between the proximal end of a first link element in the section uniquely attached to the hub and the proximal end of the other link element in this first, hub attached section (i) decreases as the scissoring rib assembly transitions from a collapsed condition to an expanded condition and (ii) increases as the scissoring rib assembly transitions from the expanded condition to the collapsed condition. A second distance between the distal end of one link element in the last section attaching to the edge member and a distal end of the other link element in this same last section (i) decreases as the at least one scissoring rib assembly transitions from the collapsed condition to the expanded condition and (ii) increases as the scissoring rib assembly transitions from the expanded condition to the collapsed condition. A distance between an end of the edge member at the periphery of the reflector assembly which is coupled to the reflector surface and an end of the hub which is closest to the reflector surface is increased as the scissoring rib assembly transitions from the collapsed condition to the expanded condition.

The deployable reflector system may also comprise a circumferential hoop (e.g., hoop assembly 160 of FIG. 1) configured to structurally support the reflector surface when the deployable reflector system is in deployed condition. The circumferential hoop is at least partially defined by the rib (e.g., rib 128 of FIG. 1) and a plurality of cords (e.g., cords 122, 124, 126 of FIG. 1) extending between the rib of the scissoring rib assembly and a rib of at least one other scissoring rib assembly.

The deployable reflector system may additionally or alternatively comprise a plurality of cords (e.g., cords 118, 120 of FIG. 1) to restrain expansion of the at least one scissoring rib assembly. The cords are coupled between the hub and the scissoring rib assembly(ies). The cords may comprise tower cord(s) coupled between the hub and the rib(s) and/or scissor hinge cord(s) coupled between the hub and hinge(s) of the scissoring rib assembly(ies).

A deployable reflector system (DRS) 100 will now be described with reference to FIG. 1. The present solution is not limited to the architecture of the DRS shown in FIG. 1. Other architectures can be employed by the DRS such as an offset reflector antenna architecture.

The DRS 100 is configured to direct energy into a desired pattern. The energy is provided by an antenna feed structure 152. Any known or to be known antenna feed structure can be used herein and suspended a distance from a surface 108 of a reflector 106 in known or to be known manners. For example, the antenna feed structure 152 can be disposed on an object 150 (for example, a vehicle such as a truck or satellite) to which the DRS 100 is coupled or to another object (for example, a post coupled to a hub 114) so as to be provided on the reflective surface side of the reflector 106 (for example, the upper side of the reflector shown in FIG. 1). The antenna feed structure 152 is generally configured to convey radio waves between a transceiver and the reflector surface 108. The antenna feed structure 152 can include, but is not limited to, an antenna horn, an orthomode transducer, a frequency diplexer, a waveguide, waveguide switches, a rotary joint, an articulating arm, active patch elements and/or electrically steerable feed.

The DRS 100 comprises a reflector 106 having a surface 108 and a support structure 110. The reflector 106 is shaped like a parabola in FIG. 1 having a perimeter of circular shape. The present solution is not limited in this regard. The reflector 106 can have other perimeter shapes such as an elliptical shape. The need for an elliptical perimeter shape satisfies requirements for the intended RF aperture to be circular. By arranging the tips of the scissoring ribs in an elliptical fashion enables projection of the RF energy in a circular energy beam. This is especially true for communication systems where the feed 152 is offset or at the periphery of the reflector structure. The paraboloidal surface 106 shape can take on other shapes as is common practice, to introduce sometimes significant perturbations, on the order of some fraction of the operational RF wavelength. For 1 GHz operation, this might be upwards of one to two inches of deviation from a paraboloid as defined in the equation, $z=r^2/(4\cdot f)$ where z is the vertical coordinate measured along the pointing direction of the paraboloid, r is the radius from the vertex or axis of symmetry of the paraboloid, and f is the focal length of the paraboloid. To shape the reflector 106 into a parabolic surface (or other reflecting surface shape), the support structure 110 comprises a circumferential hoop assembly 160 having a thickness t which extends in the longitudinal direction aligned with the central axis 140 when the DSR 100 is in its fully deployed condition shown in FIG. 1. The hoop assembly 160 extends some predetermined distance out of a plane defined by the peripheral edge 144 of the reflector surface 108. This distance is usually greater than the depth of the reflector 106 as measured along the axis 140. The hoop assembly 160 is generally defined by edge members 128 and cords 122, 124, 126. Edge members and cords will be discussed in more detail below.

The reflector surface 108 can include, but is not limited to, a mesh reflector surface or a solid reflector surface. The surface 108 is formed of a single layer of material or a plurality of stacked layers of material (for example, two stacked web layers). The material comprises any material that is highly reflective and/or conductive. For example, the reflector 106 is formed of a reflective film or conductive metal mesh. Reflective films and conductive metal meshes used for this purpose are well-known in the art and therefore will not be described here in detail. One such conductive mesh material is described in U.S. Pat. No. 8,654,033 to Sorrell et al. Due to the highly flexible nature, these materials are inherently collapsible, such that they can be compactly stowed when the DRS 100 is in the collapsed condition. For example, the mesh material in some scenarios can be stored in a folded condition when the DRS 100 is collapsed for stowage.

The reflector may comprise a plurality of panels 116 coupled to each other, for example, via stitching and/or an adhesive. A perspective view of a panel is shown in FIG. 2. Each panel is optionally supported by a series of trusses 202-218. Each truss includes at least one front cord 222, at least one rear cord 224, at least one surface tie cord 226, and at least one edge tie cord 228. The front cord 222 is connected to the reflector panel material 230. The surface tie cord(s) 226 is(are) connected between the front cord 222 and the rear cord 224. Similarly, the edge tie cord(s) 228 is(are) connected between the front cord 222 and the rear cord 224. The rear cord(s) 224 form(s) an outer edge of the reflector panel and is(are) also referred to as front outboard intercostal cord(s). The front cord that is closest to the center of the reflector is also referred to as an inboard costal cord. The cords 222-228 of the trusses 202-218 have slack when the DRS 100 is in the collapsed configuration (or condition) but are taunt when the DRS 100 is in the fully expanded (or deployed) configuration (or condition) shown in FIG. 1.

Figure 2:
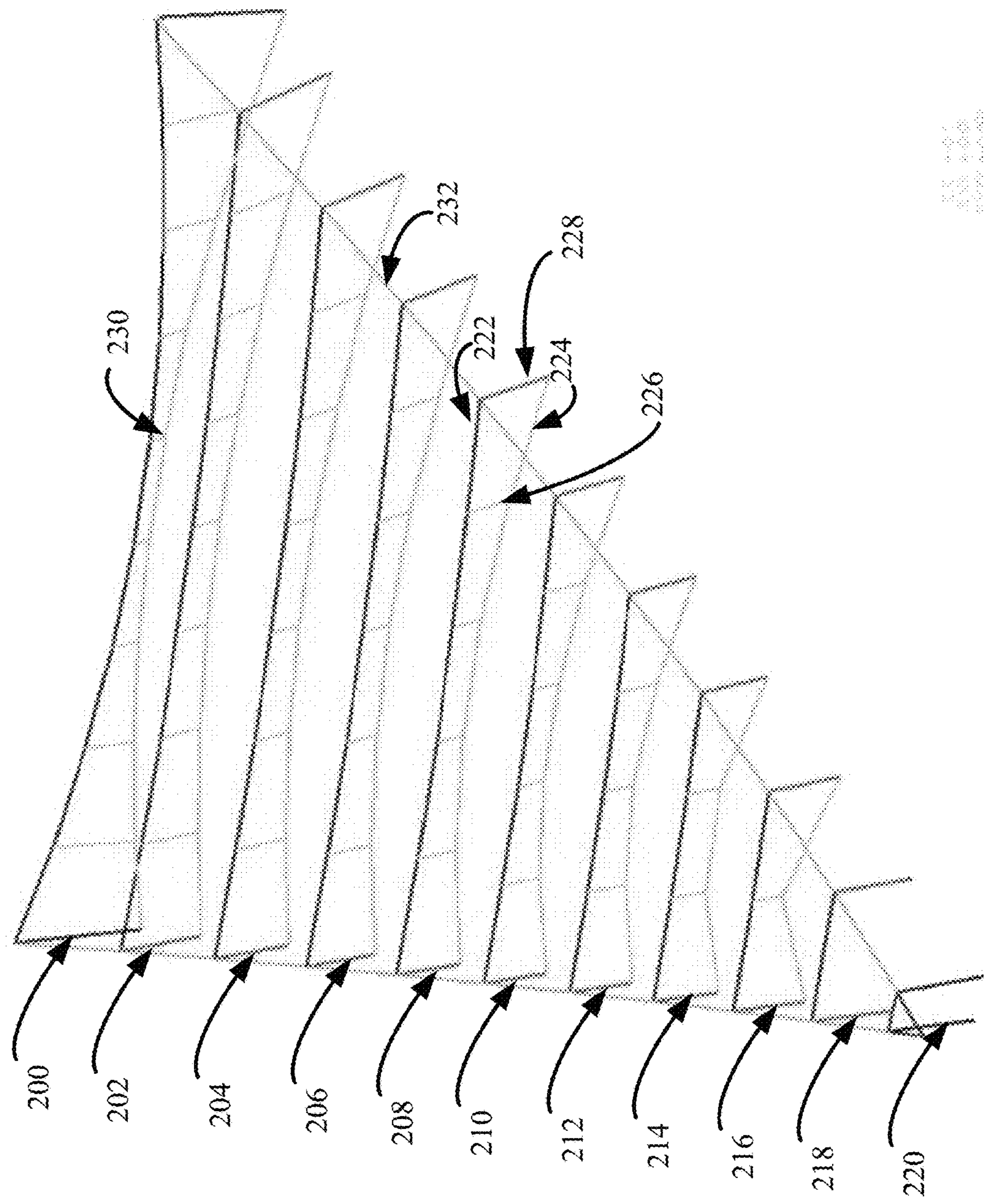
FIG. 2 is a top perspective view of a panel of the reflector system shown in FIG. 1.

The edge tie cord(s) 228 may provide a dimensional control to ensure the reflector panel material 230 and the cord edge element or strip cord 232 is spaced apart from the respective scissoring rib assemblies by a prescribed distance when the DRS 100 is in its deployed condition (or position) shown in FIG. 1. The reflector panel may further comprise outer strip cords 232 along the side edges thereof and a center patch cord 220.

As shown in FIG. 1, the reflector 106 is structurally supported by the support structure 110. The support structure 110 is in its fully expanded condition in FIG. 1. The support structure 110 comprises a plurality of scissoring rib assemblies 102 and a cord truss system 112 for the reflector 106. The scissoring rib assemblies 102 and cord truss system 112 are coupled to the hub 114. Eight scissoring rib assemblies are shown in FIG. 1. The present solution is not limited in this regard. DRS 100 can include any number of scissoring rib assemblies selected in accordance with a given application.

The scissoring rib assemblies 102 collectively define an area 104 in which the deployable reflector surface 108 is to reside. Each scissoring rib assembly 102 is configured so that it can: deploy from a stowed condition shown in FIG. 6 to an expanded condition shown in FIGS. 1, 3, 5 and 7; and collapse from the expanded condition into the stowed condition. The manner in which the scissoring rib assemblies operate will become apparent as the discussion progresses. Generally, each scissoring rib assembly comprises interconnected linkages in which two adjacent ones pivot relative to each other similar to a pair of scissors.

When the scissoring rib assemblies 102 are in the stowed condition, the DRS 100 is reduced in size such that it may fit within a compact space (e.g., a compartment of a spacecraft or on the side of a spacecraft). The scissoring rib assemblies 102 can have various configurations and sizes depending on the system requirements. The scissoring rib assemblies 102 allow for the DRS 100 to have a smaller overall stowed volume and/or expanded condition as compared to conventional deployable antenna designs. A further advantage of the system disclosed herein is that it can offer reduced weight as compared to such conventional designs.

Figure 3:
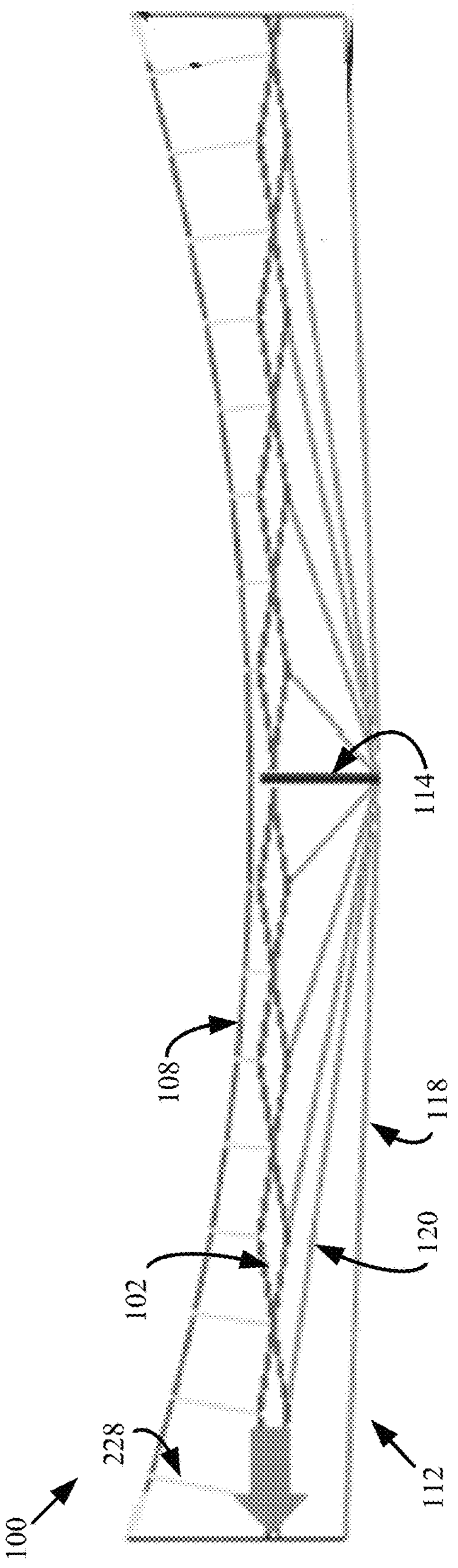
FIG. 3 is a side view of the reflector system shown in FIG. 1.
Figure 4:
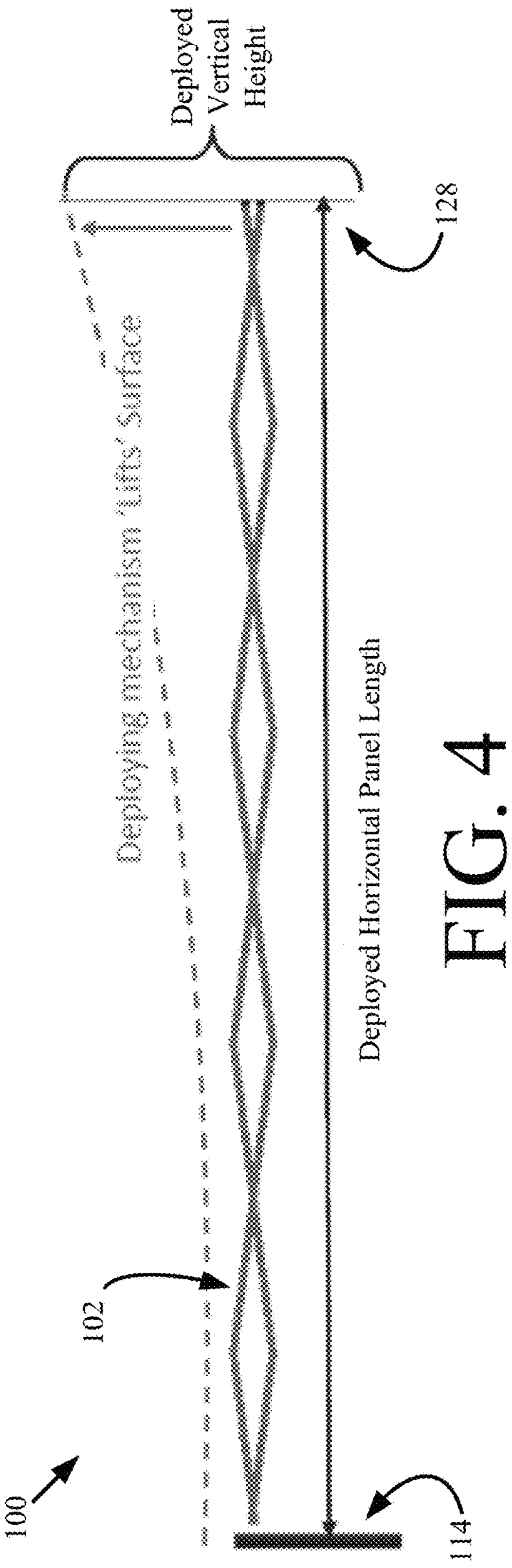
FIG. 4 provides an illustration that is useful for understanding a deploying mechanism of the reflector system shown in FIG. 1.
Figure 5:
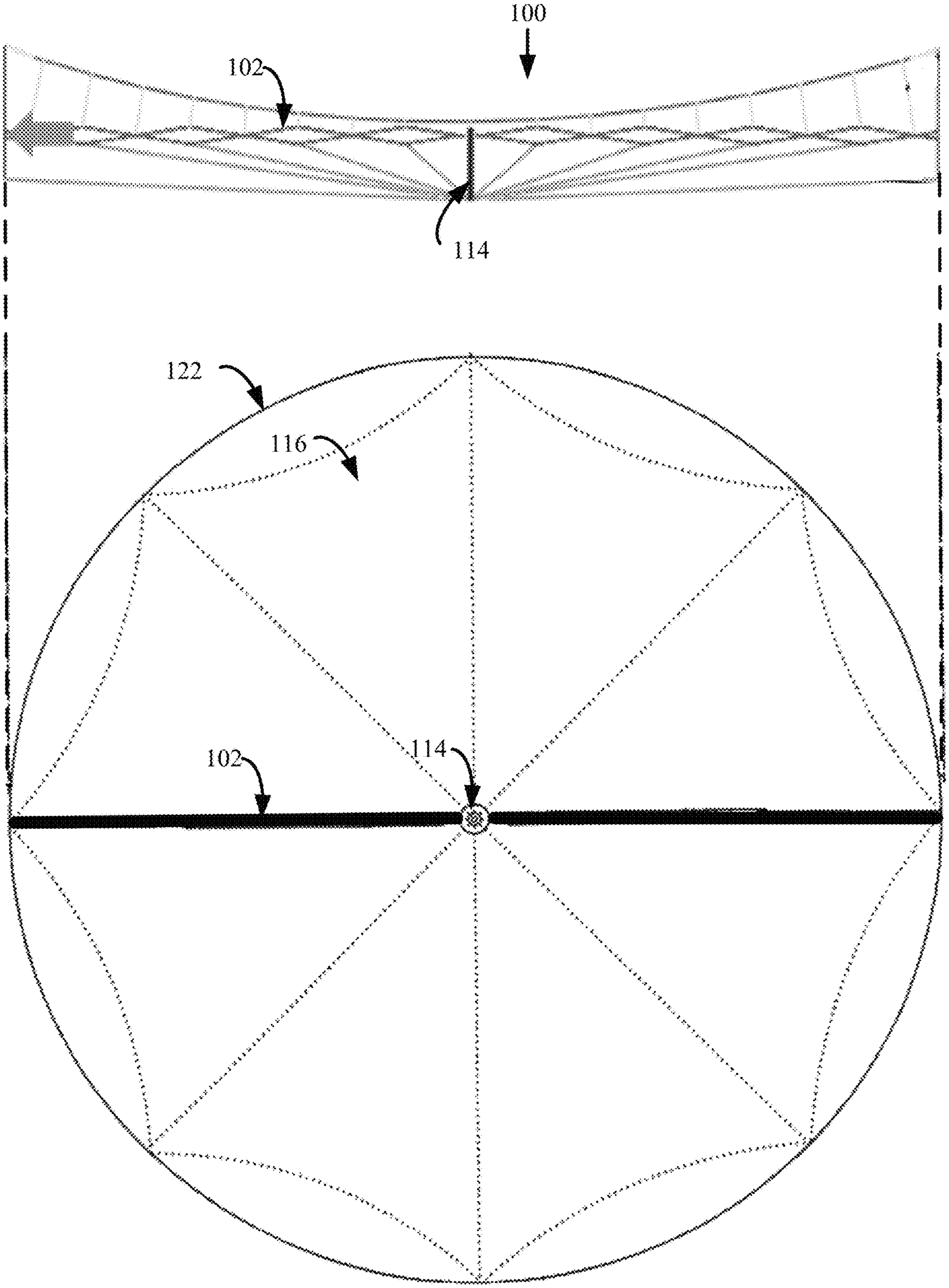
FIG. 5 provides an illustration showing a side and top view of the reflector system in the deployed position.

The cord truss system 112 is configured to restrain expansion of the scissoring rib assemblies 102 and at least partially define the circumferential hoop of the DRS 100. As shown in FIG. 3, the cord truss system 112 comprises at least one tower cord 118, at least one scissor hinge cord 120, at least one upper hoop cord 122, at least one lower hoop cord 124, and at least one diagonal hoop cord 126. Other cords in addition to or as an alternative may be used in the cord truss system 112. The tower cord(s) 118 is(are) connected between the hub 114 and a vertical edge member 128. The term "vertical" is used herein to indicate a direction which is generally aligned with the direction of the central, longitudinal axis 140 of the DRS 100. The edge member 128 is coupled at a distal end 130 of a respective scissoring rib assembly 102. The scissor hinge cord 120 is connected between the hub 114 and a hinge of a scissoring rib assembly 102. The upper hoop cord 122 is connected between first ends 132 of two adjacent edge members 128. The lower hoop cord 124 is connected between second ends 134 of two adjacent edge members 128. The diagonal hoop cord 126 is connected between a first end 132 of a first edge member and a second end 134 of a second adjacent edge member. Two diagonal hoop cords 126A and 126B can be provided between each pair of adjacent edge members as shown in FIG. 1. The present solution is not limited in this regard. Alternatively, a single diagonal hoop cord can be provided between each pair of adjacent edge members in accordance with a given application.

Pinned end fittings at the end of each cord can be used to couple the cords to the hub 114, edge members 128 and/or scissoring rib assemblies 102. Any known or to be known end fitting can be used here. One such known end fitting that can be used here is discussed and shown in at least FIG. 9 of U.S. Pat. No. 10,707,552 to Harless. The cords 118-126 of the cord truss system 112 have slack when the DRS 100 is in the collapsed configuration (or condition) but are taunt when the DRS 100 is in the fully expanded (or deployed) configuration (or condition) shown in FIG. 1.

The hub 114 contains a drive mechanism that creates the motive force and motion to drive the sliding proximal end of the sliding link in the section attaching to the hub towards the rotating proximal end of the other link in this same section. The drive mechanism can be, for example, a ball-screw drive mechanism that converts rotary motion to linear motion. Any known or to be known ball-screw drive mechanism can be used here.

Figure 6:
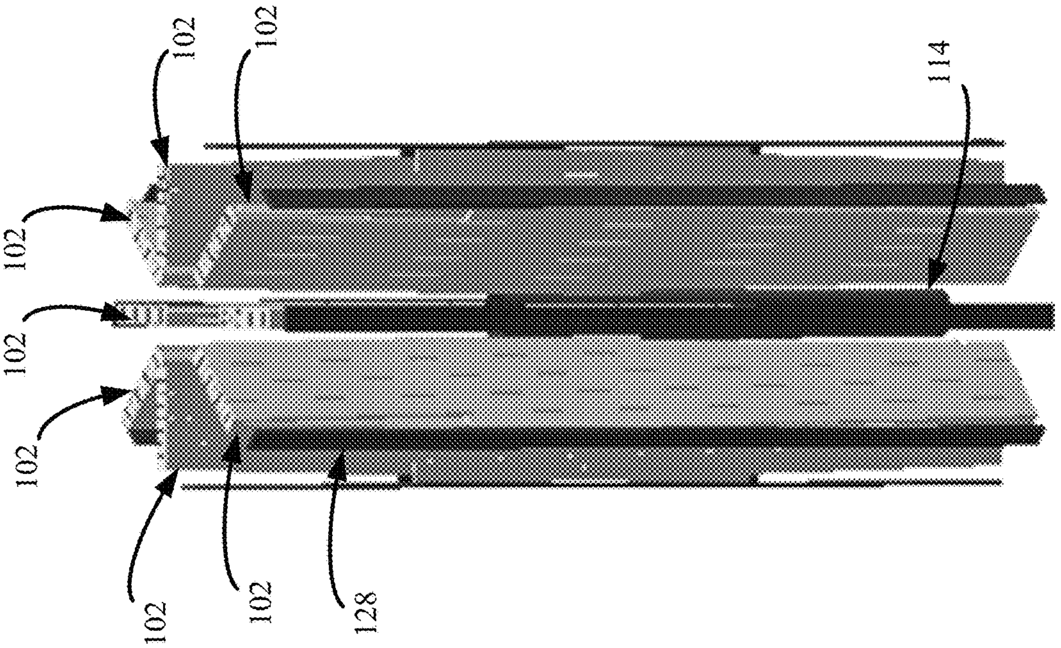
FIG. 6 provides an illustration showing a scissor structure of the reflector system of FIG. 1 in a collapsed condition (or position).
Figure 7:
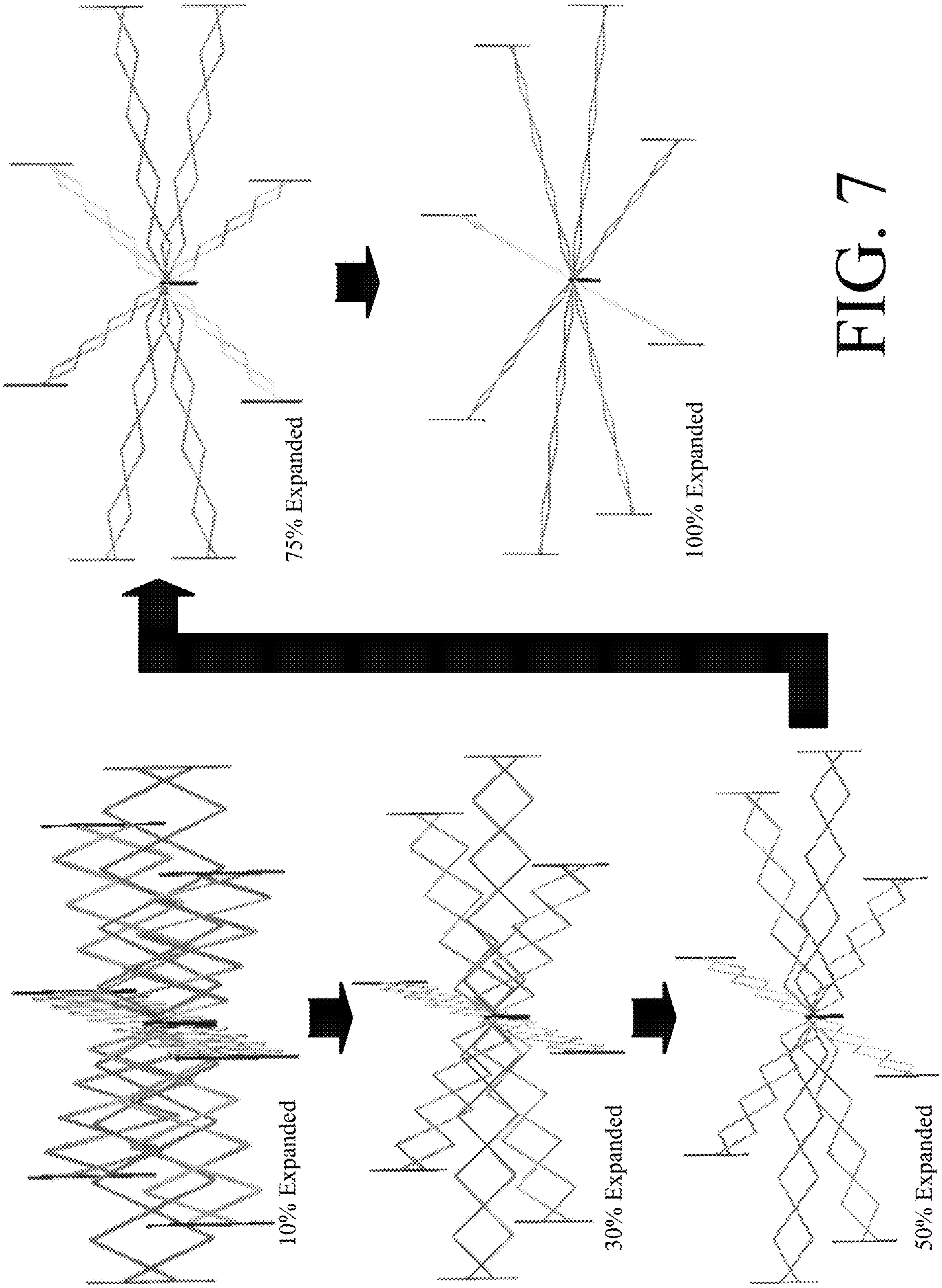
FIG. 7 shows the scissor structure of FIG. 6 being transitioned to a fully expanded condition.

Referring now to FIG. 6, there is provided an illustration showing the scissoring rib assemblies 102 in their collapsed condition. Illustrations showing the scissoring rib assembly 102 in various intermediary conditions and a fully expanded condition are provided in FIG. 7. The reflector 108 and cords are not shown in FIGS. 6-7 for simplicity and clarity of the illustration. The scissoring rib assemblies 102 can be transitioned from their collapsed condition to an expanded condition.

The link elements are envisioned, for simplicity, to be constructed of Carbon Fiber Reinforced Plastic (CFRP) of solid, rectangular cross-section. This makes production of all the link elements very simple as they can be cut from a sheet of CFRP of the thickness required. It is envisioned the thickness of the links in the single, double configuration where the single link packages between the double pair when closed, the doubles should have half the thickness of the single. This is the configuration depicted in FIG. 6. It presents a series of 'walls' of stowed scissors ribs that can readily be secured to survive the somewhat harsh environment of closed, or stowed, loads during launch on a rocket. The configuration also lends itself to providing clean faces of a pie shape between each successive pairs of rib assemblies for packaging the slack mesh and slack cord surface elements.

The links can also be tubular CFRP elements of either circular or rectangular cross-section. If rectangular in cross-section, then the advantages of the clean faces of the stowed, or closed, rib assemblies apply as just described. If circular in cross-section, the faces of the stowed, or closed, rib assemblies become less clean presenting additional packaging issues for the slack surface and slack cord elements to prevent inadvertent interference or potential snagging of the slack surface elements on the rib assembly hardware.

Figure 8:
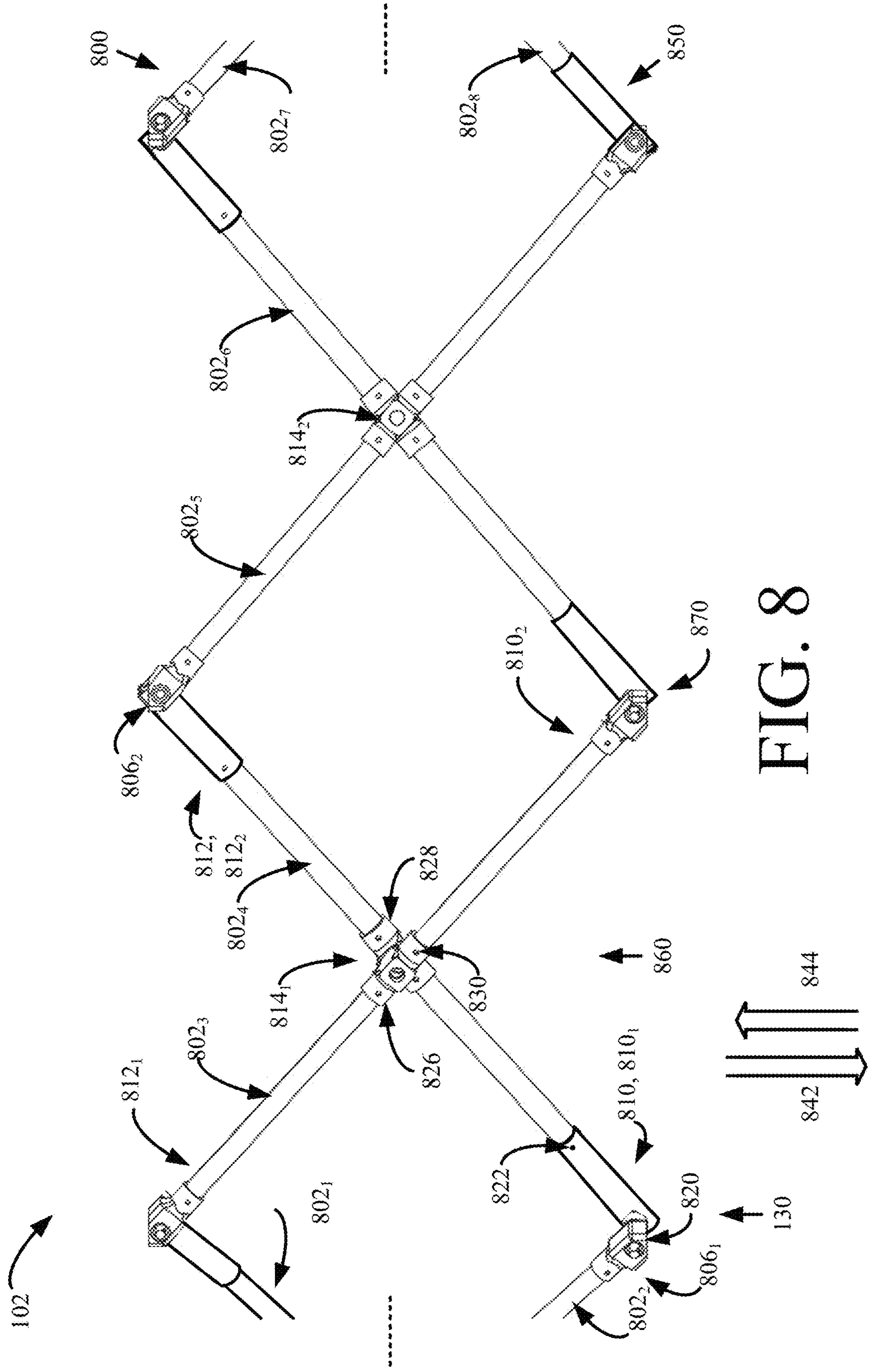
FIG. 8 provides an illustration showing a scissor structure of the reflector system of FIG. 1 in a partially expanded condition (or position).
Figure 9:
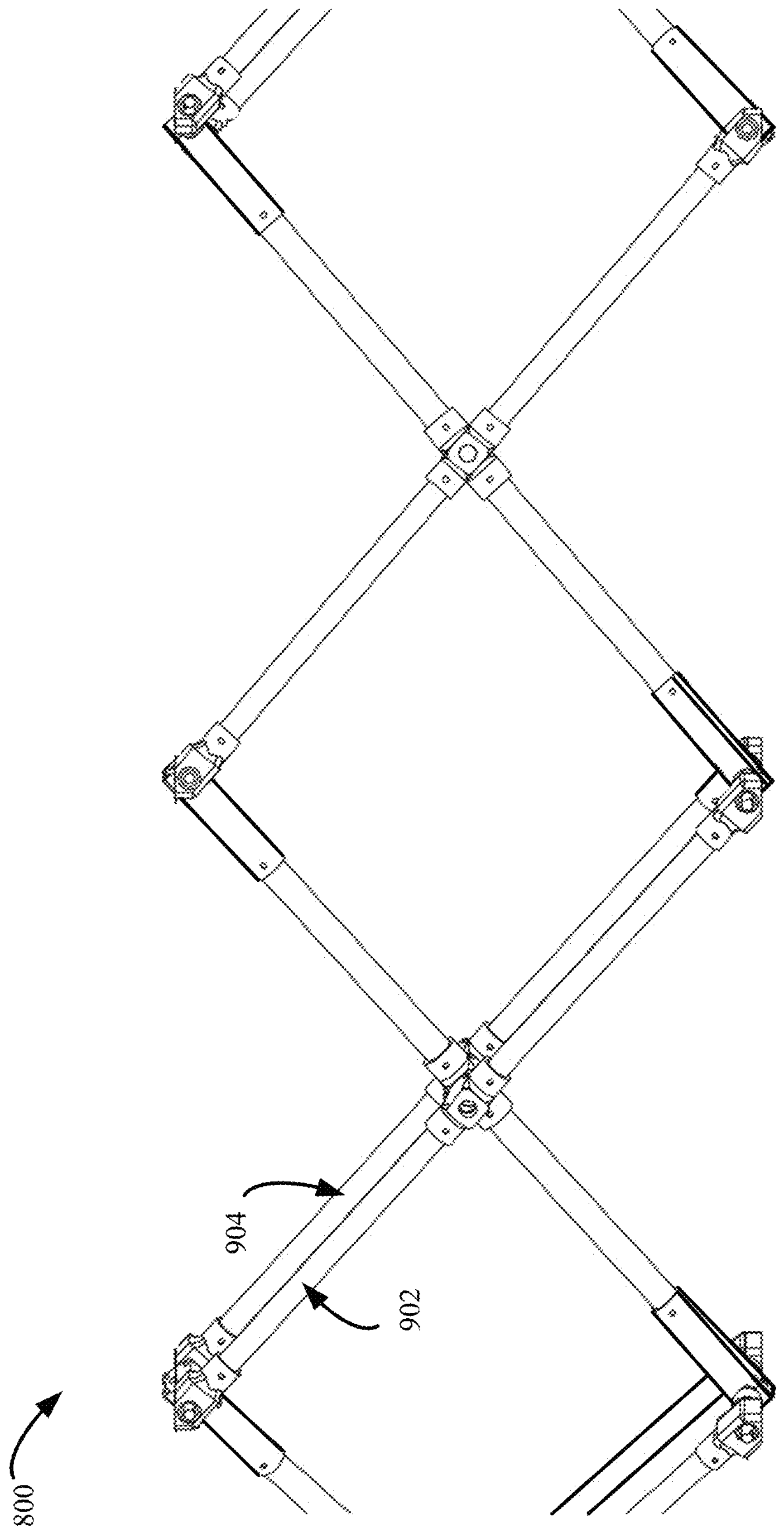
FIG. 9 provides an illustration of another scissoring rib assembly architecture in a partially expanded condition (or position).

With reference to FIGS. 8-9, architectures for a scissoring rib assembly are shown. The scissoring rib assembly architecture of FIG. 9 is similar to that of FIG. 8, but has parallel link elements 902, 904. This arrangement of parallel link elements can provide a more compact stowed or collapsed condition for an antenna assembly which can be desirable in many application (for example, satellite applications), as well an improved structural strength. A detailed discussion of the simpler architecture of FIG. 8 will be provided below. This detailed discussion is sufficient for understanding the more complex architecture of FIG. 9.

With reference to FIG. 8, each scissoring rib assembly 102 comprises a plurality of link elements $802_1$, $802_2$, $802_3$, $802_4$, $802_5$, $802_6$, $802_7$, $802_8$ (collectively referred to as "802") and a plurality of hinge members 806, 808. Although seven link elements are shown in FIG. 8, each scissoring rib assembly can comprise any number of link elements selected in accordance with a particular application. Each link element can be comprised of a fixed length rigid structure. The fixed length rigid structure can include, but is not limited to, a rigid tubular structure formed of a rigid lightweight material. The rigid lightweight material can include, but is not limited to, metallic or a Carbon Fiber Reinforced Polymer [or Plastic] (CFRP) composite material. The fixed length rigid structure can include a single piece or multiple pieces extending in parallel with each other.

The link elements are arranged into two sets 800, 850. For example, the first set 800 comprises link elements $802_1$, $802_3$, $802_6$, $802_7$. The second set 850 comprises link elements $802_2$, $802_4$, $802_5$, $802_8$. The link elements of each set are connected to each other via hinge members 806. More specifically, each link element extends between a hinge member $806_1$ disposed on a first end 810 thereof and a hinge member $806_2$ disposed on a second opposing end 812 thereof. Hinge members $806_1$ and $806_2$ are the same as each other and are collectively referred to as 806. In this way, the link elements of each set 800, 850 can be transitioned between a collapsed condition shown in FIG. 6 and a fully expanded condition shown in FIG. 7. The link elements are substantially parallel to one another when the scissoring rib assembly is in its collapsed condition (or position). The link elements generally define a rib assembly when the scissoring rib assembly is in its expanded condition (or position).

Each hinge member $806_1$, $806_2$ pivotally couples two adjacent link elements to each other so that they can move in at least one degree of freedom relative to each other. For example, hinge member $806_1$ pivotally couples link elements $802_2$ and $802_4$ to each other, and hinge member $806_2$ pivotally couples link elements $802_4$ and $802_5$ to each other. Any known or to be known hinge mechanism can be used here. Coupler(s) 822 can be used with socket element 818 to facilitate secure coupling of the link element to a hinge member. Couplers 822 can include, but are not limited to, pins, posts, screws and bolts.

The scissoring rib assembly also comprises a plurality of pivot members $814_1$, $814_2$ (collectively referred to as "814") to couple the first and second sets 800, 850 of link elements to each other. Each pivot member is disposed at a pivot point on two respective link elements. The pivot point can include the center or midpoint of each one of the two respective link elements such that the pivot point is located at an approximately equal distance from the opposing ends 810, 812 of each link element. For example, pivot member $814_1$ is coupled to link element $802_3$ and $802_4$, and pivot member $814_2$ is coupled to link element $802_5$ and $802_6$. Each pivotally coupled pair of link elements $802_3$/$802_4$ and $802_5$/$802_6$ defines an X-member 860 of the scissoring rib assembly since they are arranged in a crossed configuration by the pivot member $814_1$ or $814_2$.

Each pivot member comprises two engagement members 826, 828 which are pivotally coupled to each other. In this way, the engagement members 826, 828 can rotate relative to each other. Each engagement member has an aperture formed therein which is sized and shaped to slidingly receive a pivoting element. The aperture can comprise a through hole such that the pivoting element extends through the engagement member as shown in FIG. 8. Coupler(s) 830 can be used with engagement members 826, 828 to facilitate retention of the pivoting element in the aperture. Couplers 830 can include, but are not limited to, pins, posts, screws and bolts.

When the two sets 800, 850 of link elements are coupled to each other via the pivot members 814, pairs of link elements are formed which mimic or operate similar to a pair of scissors. For example, a pair of link elements includes link element $802_3$ of set 800 and link element $802_4$ of set 850. These link elements $802_3$, $802_4$ are coupled to each other via pivot member $814_1$ to facilitate a scissor motion by the link elements. As a result of the scissor motion, distances between ends $810_1$, $812_1$ and ends $810_2$, $812_2$ of the link elements $802_3$, $802_4$ are reduced when the scissoring rib assembly 102 is being deployed and increased when the scissoring rib assembly is being collapsed.

Deployment of the scissoring rib assembly 102 can be achieved in many ways. One deployment technique uses ball screw mechanism. Any known or to be known ball screw mechanism can be used here. The manner in which the ball screw mechanism can be used to deploy a scissoring rib assembly will become evident as the discuss progresses. Generally, rotation of the ball screw in a first direction causes expansion of the scissoring rib assembly, while rotation of the ball screw mechanism in an opposing second direction causes the scissoring rib assembly to collapse.

Other deployment techniques can involve implementation of a cable system as described in U.S. Pat. No. 10,516,216. A cable would extend through the inside of each link element and pull each pair of distal points in each section together to deploy. Additionally, or alternatively, the scissoring rib assembly deployment can be achieved via controlled actuation of motors and gears provided at each hinge or joint 870 of the two sets 800, 850. In this way, each set 800, 850 of link elements may comprise an articulating arm with a plurality of hinges or joints that are controlled by a controller disposed, for example, in the hub 114 of FIG. 1 or an object (for example, a vehicle) to which the hub 114 is mounted. The scissoring rib assembly can be collapsed via the application of a pushing force in a vertical direction 842 or 844 to the distal end 130 of the scissoring rib assembly 102 and/or the controlled actuation of motors and gears provided at each hinge or joint 870 of the two sets 800, 850. Any known or to be known technique for motorized hinges or joints can be used here.

As noted above, the present solution is not limited to the particular scissor assembly architecture shown in FIG. 8. Another scissor assembly architecture that can be used is shown in FIG. 9. At least one of the two sets of link elements comprises parallel link elements 902, 904. This arrangement of parallel link elements can provide a more compact stowed or collapsed condition for an antenna assembly which can be desirable in many application (for example, satellite applications)

Figure 10:
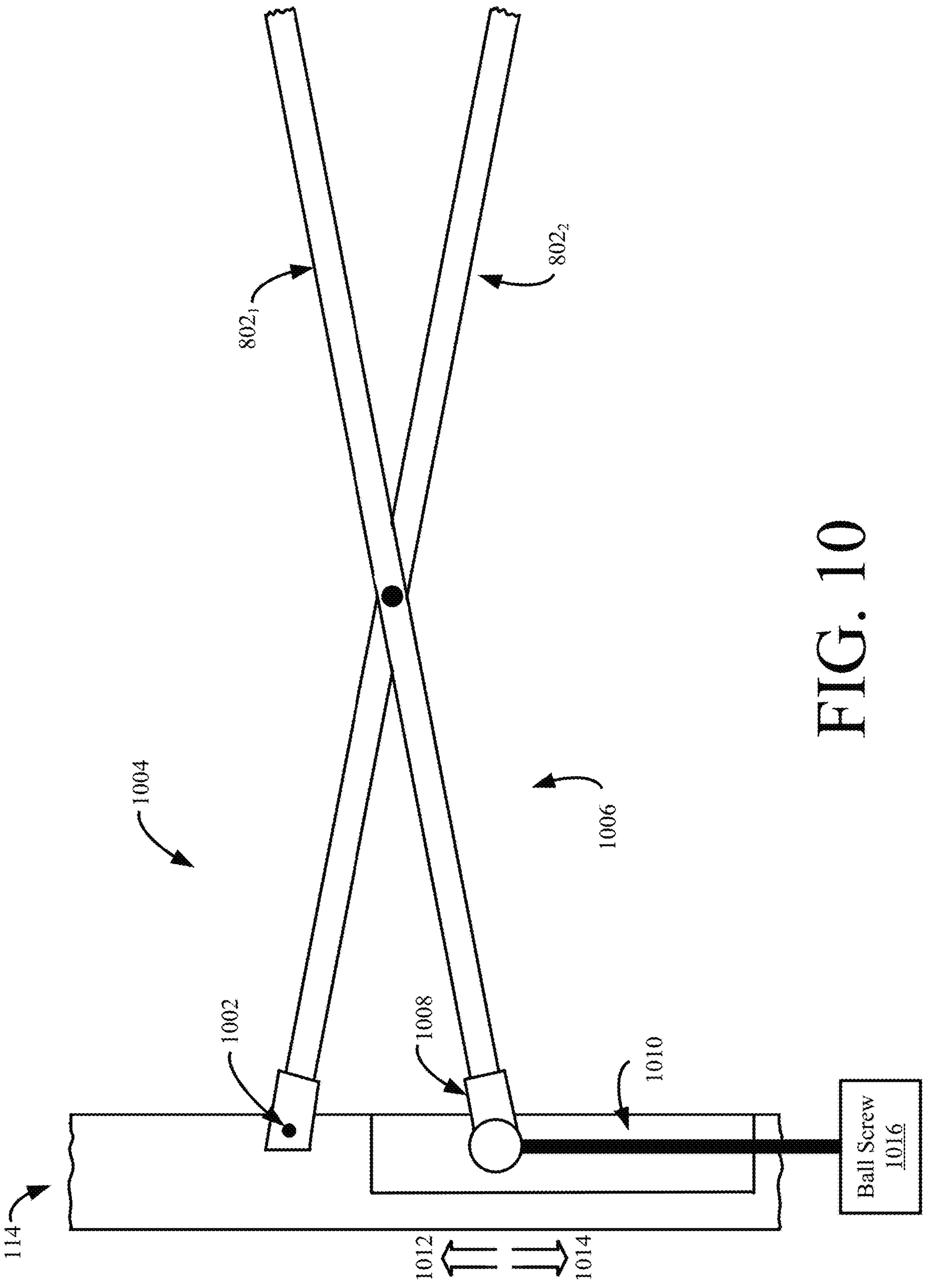
FIG. 10 provides an illustration showing a coupling between a hub and a scissoring rib assembly.

As noted above in relation to FIG. 1, each scissoring rib assembly 102 has a proximal end 142 coupled to the hub 114. Illustrations are provided in FIGS. 10 and 11 that are useful for understanding this coupling. As shown in FIG. 10, the proximal ends 1004, 1006 of link elements $802_1$, $802_2$ of FIG. 8 are coupled to the hub 114. The hub 114 can comprise a rigid tubular structure formed of a rigid lightweight material. The rigid lightweight material can include, but is not limited to, metallic or CFRP composite material. The link element $802_2$ is securely and rotatably coupled to the hub 114 via a coupler 1002. The coupler 1002 can include, but is not limited to, a pin about which the proximal end 1004 of the link element $802_2$ rotates or otherwise pivots.

In contrast, the link element $802_2$ is securely and slidingly coupled to the hub 114 via a coupler 1008. A channel or track 1010 is provided inside the tubular structure of the hub 114 to facilitate sliding engagement between coupler 1008 of link element $802_1$ and the hub 114. The coupler 1008 of link element $802_1$ can slide in two opposing directions 1012, 1014 within the channel or track 1010. In this way, the scissor motion of the link elements $802_1$, $802_2$ is facilitated. The sliding of link element $802_1$ in the directions 1012, 1014 can be controlled via a ball screw 1016. Any known or to be known ball screw can be used here. Rotation of the ball screw 1016 is a first direction causes the coupler 1008 of link element $802_1$ to slide in direction 1012 within the channel or track 1010, while rotations of the ball screw 1016 is a second opposing direction causes the coupler 1008 of link element $802_1$ to slide in direction 1014 within the channel or track 1010. In this way, the scissoring rib assembly 102 can controllably transitioned between its collapsed condition and its expanded condition.

Figure 11:
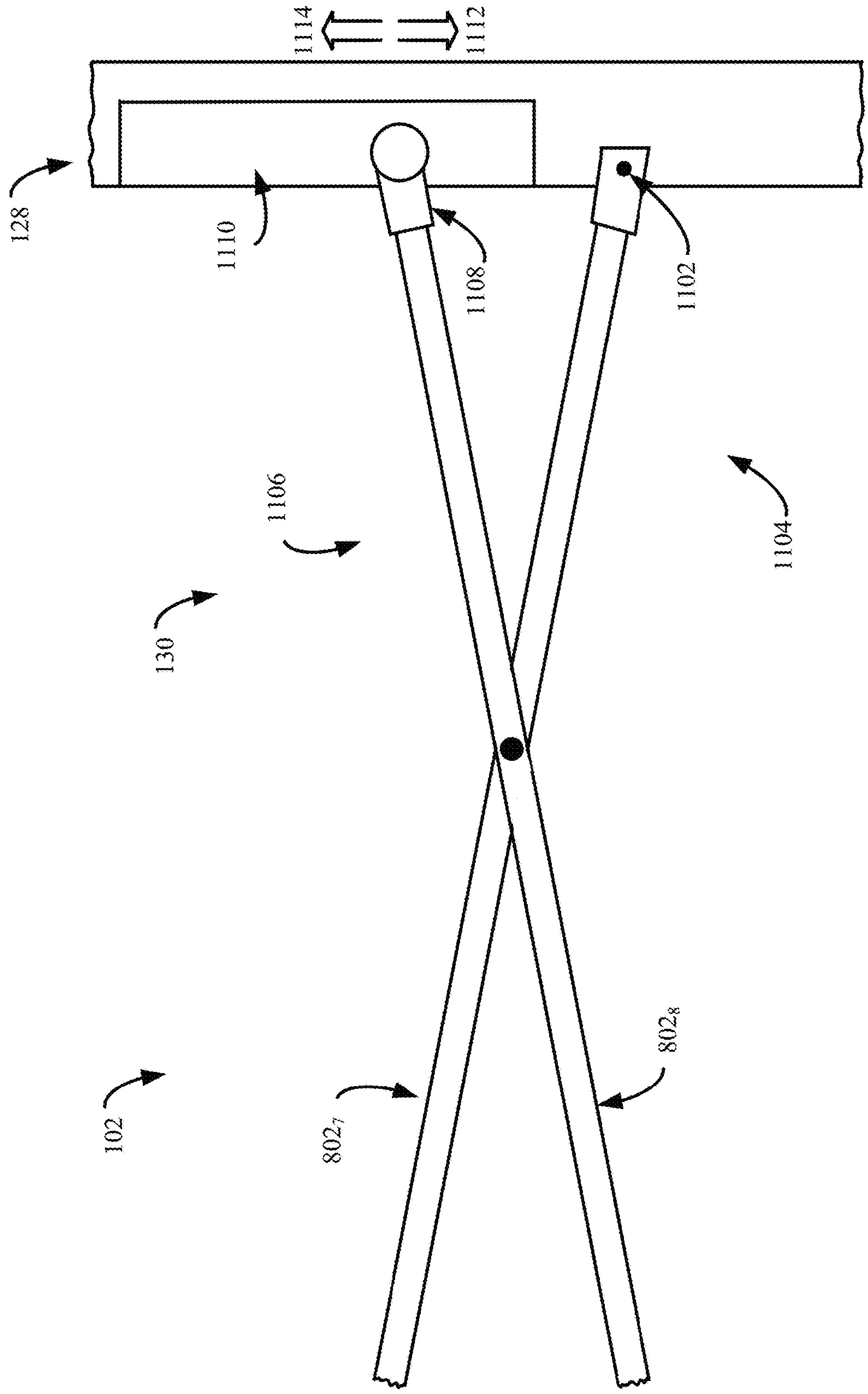
FIG. 11 provides an illustration showing a coupling between an edge member and a scissoring rib assembly.
Figure 12A:
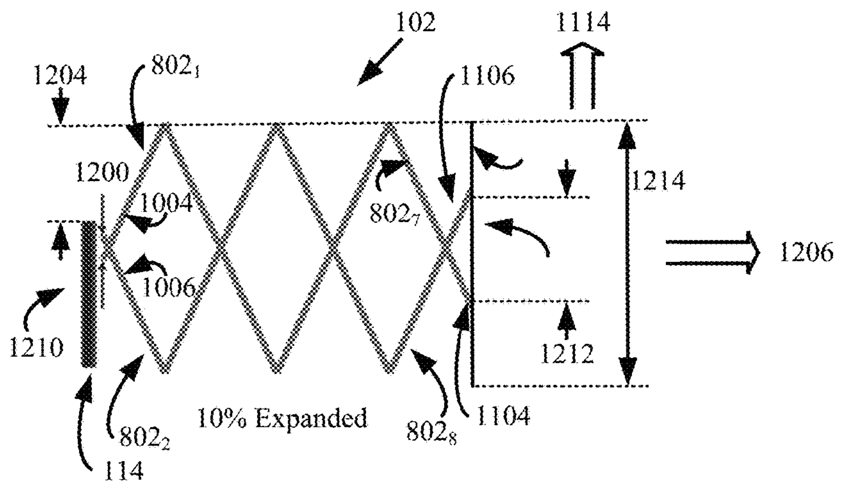
FIGS. 12A-12E (collectively referred to as "FIG. 12") provide illustrations showing an expansion of a scissoring rib assembly.
Figure 12B:
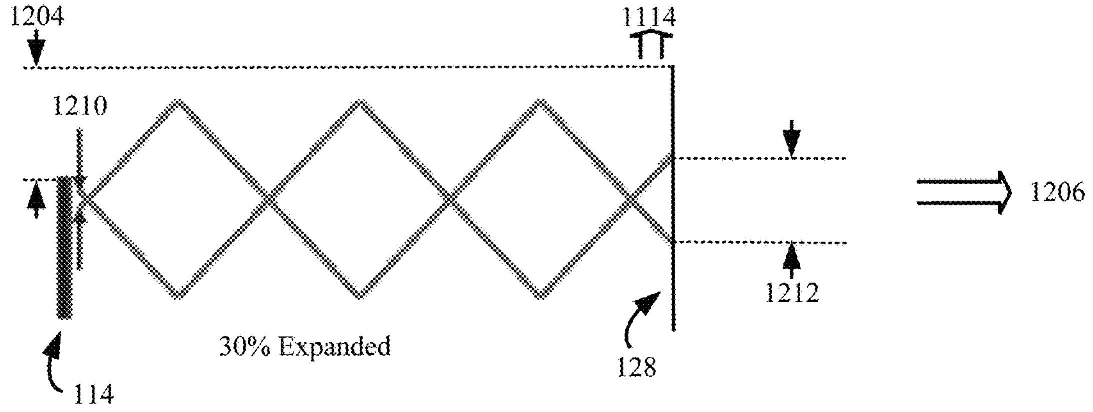
Figure 12C:
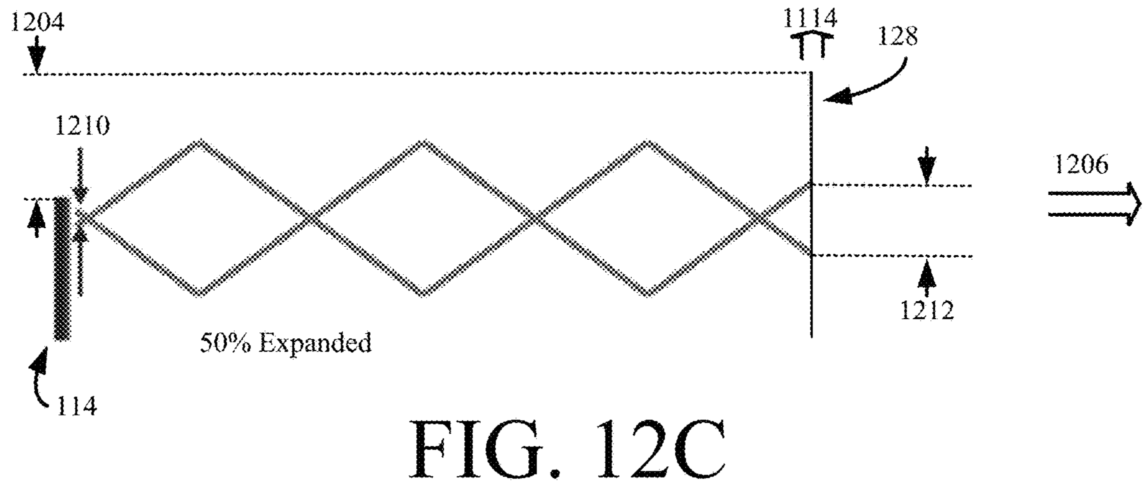
Figure 12D:
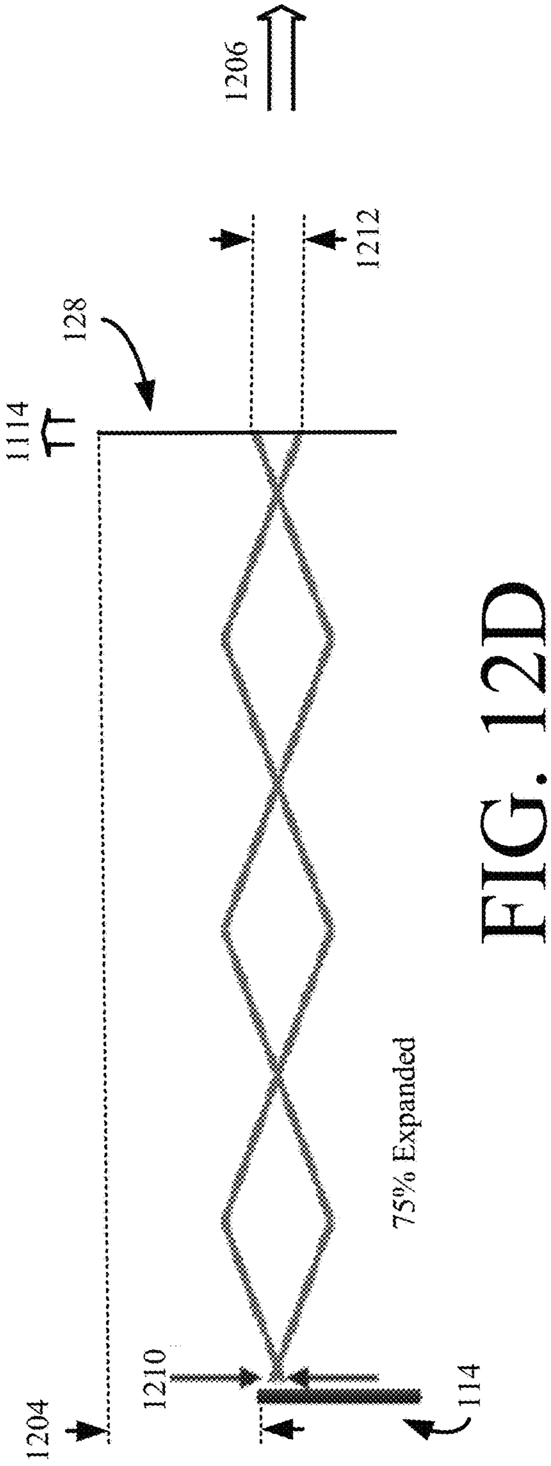
Figure 12E:

With reference now to FIG. 11, the manner in which the distal end 130 of the scissoring rib assembly 102 is coupled to the edge member 128 will now be discussed. The proximal ends of the last section 1104, 1106 of link elements $802_7$, $802_8$ of FIG. 11 are coupled to the edge member 128. The edge member 128 can comprise a rigid tubular structure formed of a rigid lightweight material. The rigid lightweight material can include, but is not limited to, metallic or CFRP composite material. The link element $802_7$ is securely and rotatably coupled to the edge member 128 via a coupler 1102. The coupler 1102 can include, but is not limited to, a pin about which the proximal end 1104 of the link element $802_7$ rotates or otherwise pivots.

In contrast, the link element $802_8$ is securely and slidingly coupled to the edge member 128 via a coupler 1108. A channel or track 1110 is provided inside the tubular structure of the edge member 128 to facilitate sliding engagement between coupler 1108 of link element $802_8$ and the edge member. The engagement member 802 is sized and shaped to slide within the channel or track 1100 of the edge member 128, while maintaining the coupling between the link element and the edge member. The coupler 1108 of link element $802_8$ can slide in two opposing directions 1112, 1114 within the channel or track 1110. In this way, the scissor motion of the link elements $802_7$, $802_8$ is facilitated. The scissor motion of the link elements $802_7$, $802_8$ causes the edge member 128 to move linearly in directions 1112, 1114 relative to the hub 114.

The linear movement of the edge member 128 is shown in FIGS. 12A-12E. As shown in FIGS. 12A-12E, the edge member 128 moves in the upward direction 1114 relative to the hub 114 while the scissoring rib assembly 102 is being expanded in direction 1206 from its collapsed condition to its expanded condition. As the scissoring rib assembly is being expanded, a vertical distance 1204 between a distal end 1208 of the edge member 128 and a distal end 1210 of the hub 114 increases. This causes reflector surface 108 to be lifted by the edge member 128 as the scissoring rib assembly expands. In this way, the reflector surface 108 is caused to have a curved cross-sectional profile since the center of the reflector 106 is securely coupled to a distal end of the hub 114. It should be noted that the stowed height of the DRS 100 is equal to the deployed height of the DRS 100. This height t (shown in FIG. 1) is defined by the height 1214 of the edge member 128.

Additionally, as the scissoring rib assembly expands, a distance 1200 between ends 1004, 1006 of link elements $802_1$, $802_2$ decreases and a distance 1212 between ends 1104, 1106 of link elements $802_7$, $802_8$ decreases. The change in these distances 1200, 1212 is facilitated by the sliding engagement of (i) the scissoring rib assembly and the hub 114 and (ii) the scissoring rib assembly and the edge member 128.

In contrast, the edge member 128 moves in the downward direction 1112 relative to the hub 114 and the distances 1200, 1212 increase while the scissoring rib assembly 102 is being collapsed. This change in distances 1200, 1212 is also facilitated by the sliding engagement of (i) the scissoring rib assembly and the hub 114 and (ii) the scissoring rib assembly and the edge member 128.

Figure 13:
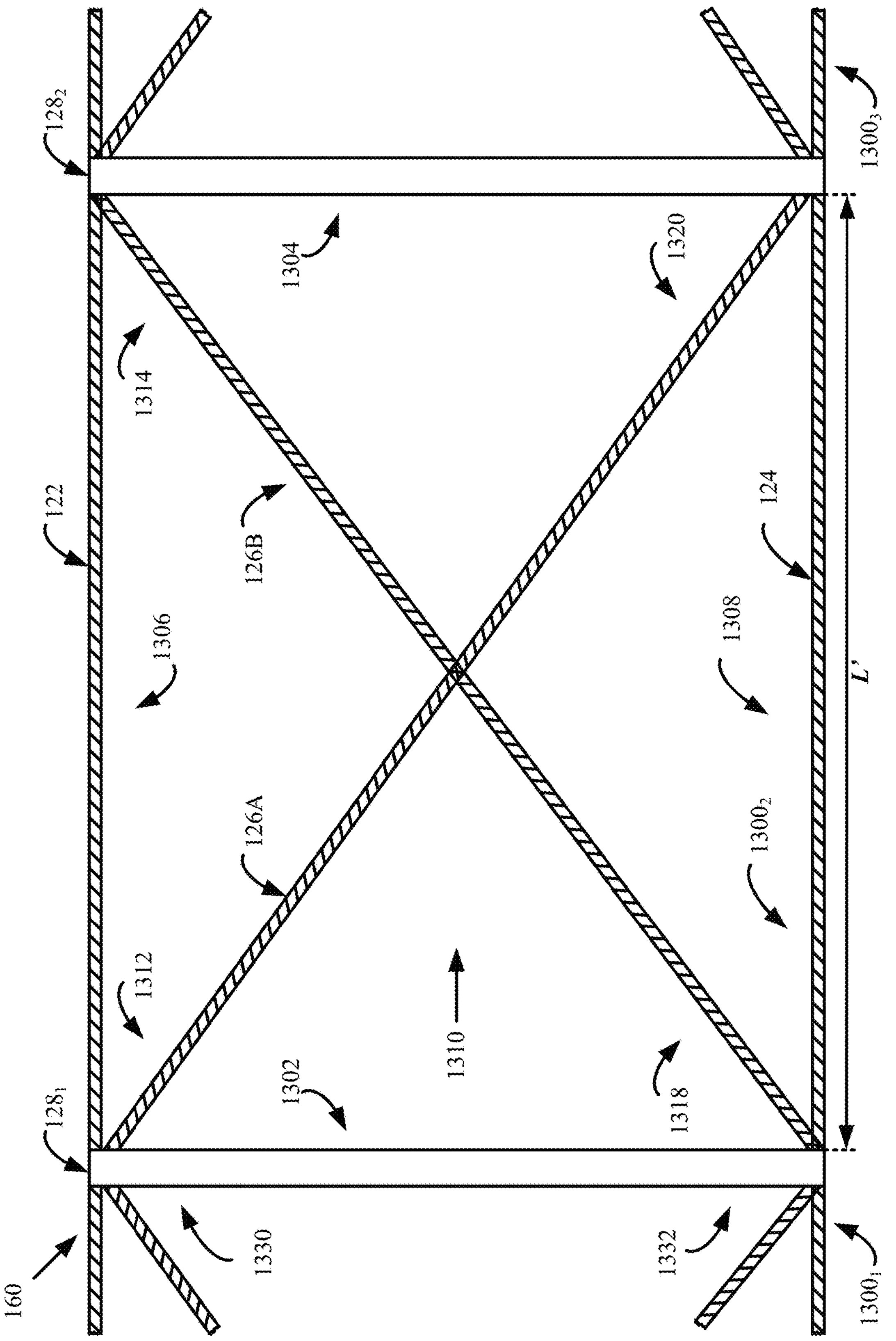
FIG. 13 provides an illustration that is useful for understanding a circumferential of FIG. 1.

FIG. 13 shows a side view of a portion of the deployed hoop assembly 106 of FIG. 1. The hoop assembly 160 comprises a plurality of hoop cords $\mathbf{1300}_N$, where N is an integer. Hoop cords $\mathbf{1300}_1$, $\mathbf{1300}_2$ and $\mathbf{1300}_3$ are shown in FIG. 13. The actual value of N can vary depending on a various design considerations. Usually for reasons of symmetry, a value for N is selected that is evenly divisible by two. Still, divisibility by two is not essential and N can alternatively be selected so that it is divisible by other values. For example, depending upon the geometry of the cord or wire network that supports and forms the surface geometry, the number of hoop cords may need to be divisible by six. Theoretically, a minimum of three sides are required to define a 3-dimensional shape, although the resulting shape may not be practical in supporting a reflector surface.

The hoop cords $\mathbf{1300}_N$ are disposed adjacently, edge to edge, and extend circumferentially to define a periphery of the hoop assembly 160. Opposing edges 1302, 1304 of each hoop cord can extend substantially along the full axial depth or thickness t of the hoop assembly 160 in a direction aligned with the longitudinal axis 140. A top 1306 of each hoop cord is substantially aligned along a top plane of the hoop assembly 160 which extends in directions orthogonal to the longitudinal axis 140. Similarly, a bottom 1308 of each hoop cord is substantially aligned along a bottom plane of the hoop assembly 160 which extends in directions orthogonal to the longitudinal axis 140. When the hoop assembly 160 is expanded, the bottom plane is spaced a distance t from the top plane.

Each of the hoop cords defines a rectangle or rectangular shape. As such, the hoop cords $\mathbf{1300}_N$ are also sometimes referred to herein as rectangular sides. Each rectangular side is comprised of a top 1306, a bottom 1306 and two opposing, vertical edges 1302, 1304 which generally define the outer periphery or edges of each rectangular side. The rectangular side can have a top and bottom which are of a length different from the two vertical edges as shown in FIG. 13. Alternatively, the top, bottom and two opposing edges can all be of the same length such that the rectangular shape is a square. The top 1306 is defined by a cord 122, and the bottom 1306 is defined by a cord 124. Each vertical edge is defined by a edge member 128. For example, a vertical edge 1302 of hoop cord $\mathbf{1300}_2$ is defined by a first edge member $\mathbf{128}_1$ and the vertical edge 1304 of hoop cord $\mathbf{1300}_2$ is defined by a second edge member 1282.

Each of the hoop cord is defined in part by an X-member 1310 which is comprised of cords 126A and 126B. The cords 126A are 126B disposed in a crossed configuration. More particularly, the cords 126A, 126B can be respectively disposed on opposing diagonals of the rectangle which defines each hoop cord. As such, each of the cords 126A, 126B can respectively include a top end 1312, 1314 which extends substantially to a top corner defined by the top 1306 and one side 1302, 1304. Each of the cords 126A, 126B can also respectively include a bottom end 1318, 1320 which extends substantially to a bottom corner of the rectangle defined by the bottom 1308 and one side 1302, 1304. The cords 126A, 126B can be spaced apart such that they do not contact each other when the hoop assembly is in its fully deployed condition shown in FIG. 1.

The cords 122, 124, 126 are tensioning elements, meaning that they are configured for applying tension between the opposing ends of the edge members 128. As such the cords 122, 124, 126 can be flexible tensile elements, such as cable, rope or tape.

To control the deployed condition (or position) of each segment of the expanded hoop assembly 160, the cords 122, 124, 126 are stiff elements, meaning that they are highly resistant to elastic deformation when under tension. While slack in the collapsed state, these elements are selected to quickly tension at their expanded length. As such, they act as a 'hard-stop' to limit further hoop expansion by restricting the distance between the top ends 1330 of the edge members and at the bottom end 1332 of the edge members. To effect 'hard-stop' behavior in these elements, the amount of stretch between the slack state and tension state should be small. For example, assume that the desired length of the top and bottom sides of each hoop cord is L. In the collapsed form, the length of cords 122, 124 between adjacent edge member is L. In the expanded form, the length of cords 122, 124 between adjacent edge members is L' which should be very nearly the same as L. This can only be achieved if the difference in length, L-L', is small, as will be the case if the element is very stiff (resistant to elastic deformation). Thus, the cord material is selected so that the cord stretches very little between a slack state and an expanded state. The degree to which control of the length L is achieved is important in this regard as it helps to maintain a desired position of the top and bottom ends 1330, 1332 of the edge members 128. This high degree of control over top and bottom ends will in turn facilitate the precision of the attached reflective surface 104 in FIG. 1.

Figure 14:
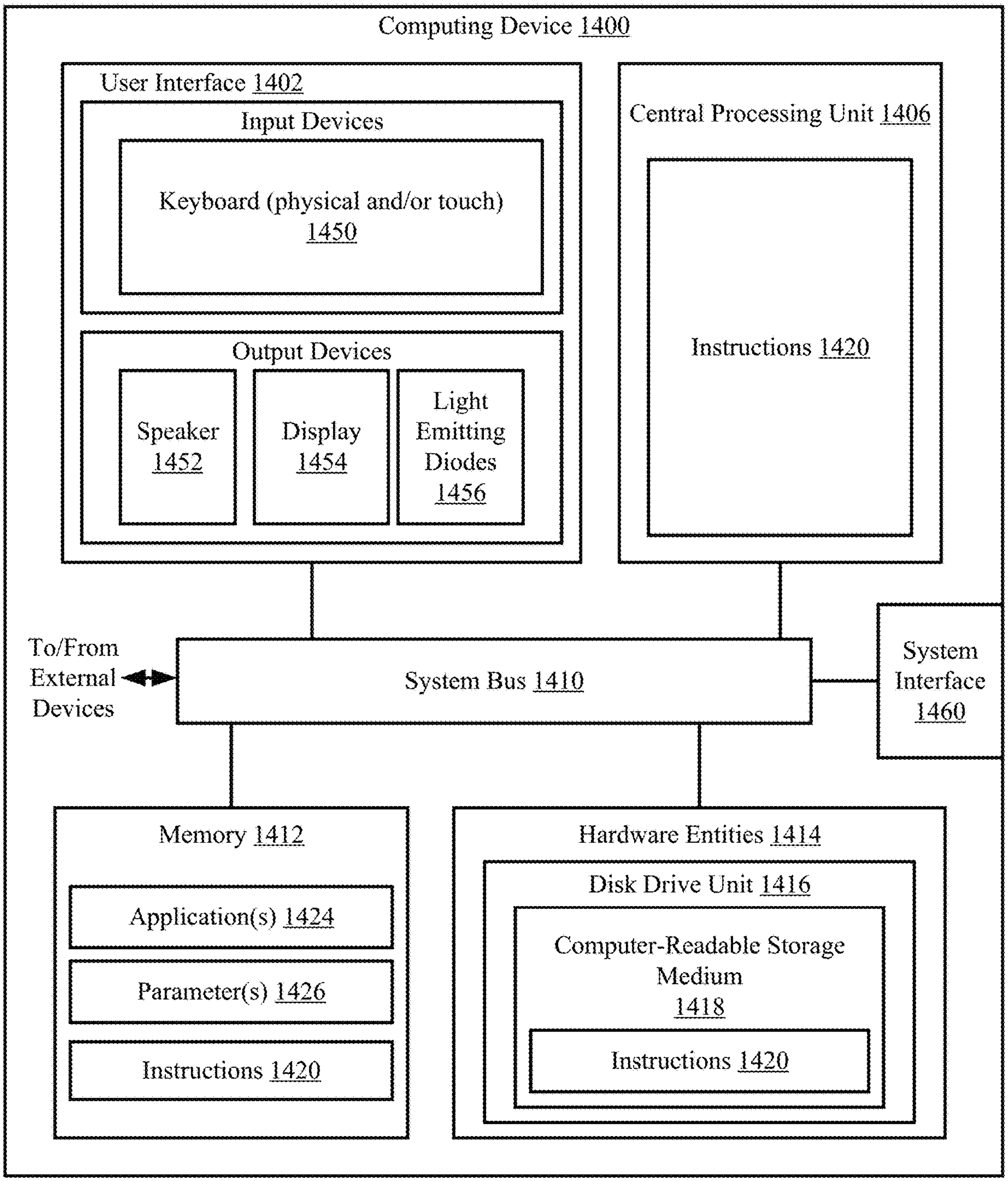
FIG. 14 provides an illustration of a computer system.

Referring now to FIG. 14, there is shown an illustrative architecture for a computing device 1400. As noted above, the hub 114 of FIG. 1 may include a controller for controlling a deployment mechanism(s) (for example, motors, gears, and/or a ball screw) and/or hinge(s)/joint(s) of the scissoring rib assemblies. The controller may be the same as or similar to computing device 1400. As such, the discussion of computing device 1400 is sufficient for understanding any controllers or the computing devices of the hub 114.

Computing device 1400 may include more or less components than those shown in FIG. 14. However, the components shown are sufficient to disclose an illustrative solution implementing the present solution. The hardware architecture of FIG. 14 represents one implementation of a representative computing device configured to receive information, process the receive information, transmit information and/or control operations of a UAV, as described herein. As such, the computing device 1400 of FIG. 14 implements at least a portion of the method(s) described herein.

Some or all components of the computing device 1400 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 14, the computing device 1400 comprises a user interface 1402, a Central Processing Unit (CPU) 1406, a system bus 1410, a memory 1412 connected to and accessible by other portions of computing device 1400 through system bus 1410, a system interface 1460, and hardware entities 1414 connected to system bus 1410. The user interface can include input devices and output devices, which facilitate user-software interactions for controlling operations of the computing device 1400. The input devices include, but are not limited to, a physical and/or touch keyboard 1450. The input devices can be connected to the computing device 1400 via a wired or wireless connection (e.g., a Bluetooth® connection). The output devices include, but are not limited to, a speaker 1452, a display 1454, and/or light emitting diodes 1456. System interface 1460 is configured to facilitate wired or wireless communications to and from external devices (e.g., network nodes such as access points, etc.).

At least some of the hardware entities 1414 perform actions involving access to and use of memory 1412, which can be a Random Access Memory (RAM), a disk drive, flash memory, a Compact Disc Read Only Memory (CD-ROM) and/or another hardware device that is capable of storing instructions and data. Hardware entities 1414 can include a disk drive unit 1416 comprising a computer-readable storage medium 1418 on which is stored one or more sets of instructions 1420 (e.g., software code) configured to implement one or more of the methodologies, procedures, or functions described herein. The instructions 1420 can also reside, completely or at least partially, within the memory 1412 and/or within the CPU 1406 during execution thereof by the computing device 1400. The memory 1412 and the CPU 1406 also can constitute machine-readable media. The term "machine-readable media", as used here, refers to a single medium or multiple media (e.g., a centralized or distributed database, and/or associated caches and servers) that store the one or more sets of instructions 1420. The term "machine-readable media", as used here, also refers to any medium that is capable of storing, encoding or carrying a set of instructions 1420 for execution by the computing device 1400 and that cause the computing device 1400 to perform any one or more of the methodologies of the present disclosure.

Figure 15:
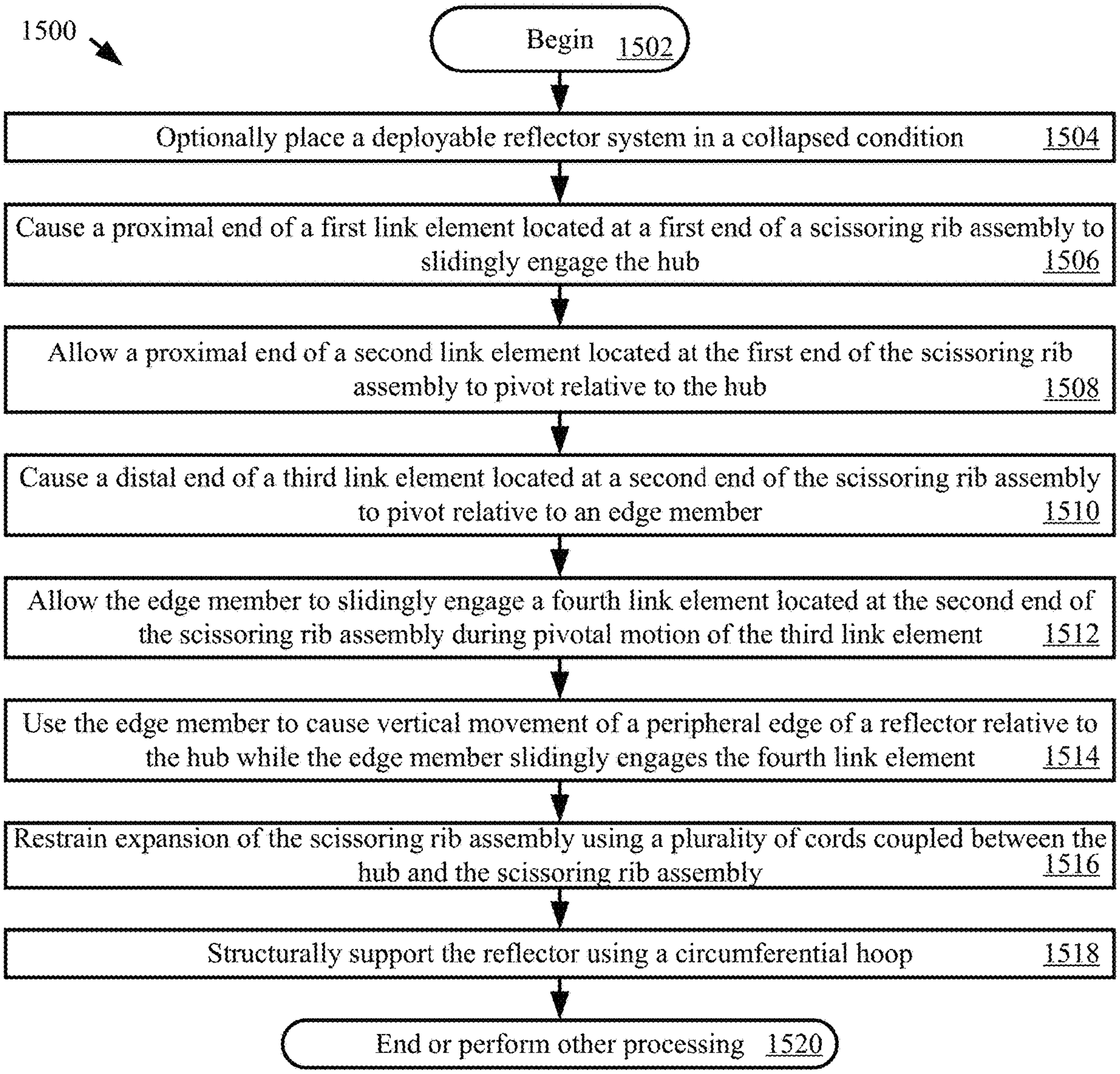
FIG. 15 provides a flow diagram of an illustrative method for controller a deployable reflector system.
Figure 16:
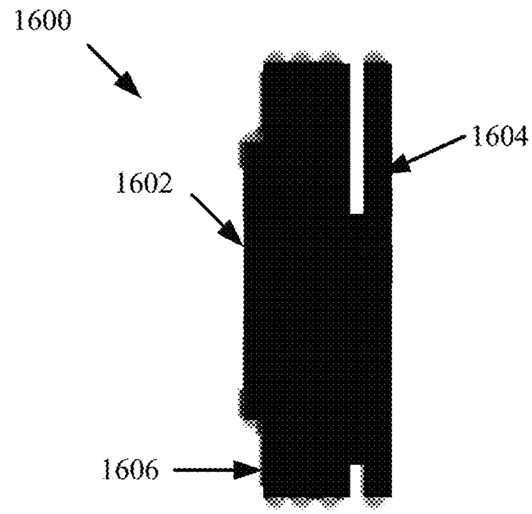
FIGS. 16-19 provide illustrations of another deployable reflector system.

Referring now to FIG. 15, there is provided a flow diagram of an illustrative method 1500 for operating a DRS (for example, DRS 100 of FIG. 1). The DRS has one or more scissoring rib assemblies (for example, scissoring rib assemblies 102 of FIG. 1). Each scissoring rib assembly has a first end (for example, proximal end 142 of FIG. 1) coupled to a hub (for example, hub 114 of FIG. 1) and a second end (for example, distal end 130 of FIG. 1) coupled to an edge member (for example, edge member 128 of FIG. 1).

Method 1500 begins with 1502 and continues with 1504 where the DRS is optionally placed in its collapsed condition (or position). Next, the DRS is transitioned from its collapsed condition to its expanded condition, or vice versa. This transition is achieved via operations of 1506-1514. These operations involve: causing a proximal end (for example, end 1006 of FIG. 10) of a first link element (for example, link element 802$_2$ of FIG. 10) located at the first end of the scissoring rib assembly to slidingly engage the hub; allowing a proximal end (for example, end 1004) of a second link element (for example, link element 802$_1$ of FIG. 10) located at the first end of the scissoring rib assembly to pivot relative to the hub so as to cause scissor motion of the scissoring rib assembly while the first link element is slidingly engaging the hub; causing a distal end (for example, end 1104 of FIG. 11) of a third link element (for example, link element $802_7$ of FIG. 11) located at the second end of the scissoring rib assembly to pivot relative to the edge member during the scissor motion of the scissoring rib assembly; allowing the edge member to slidingly engage a fourth link element (for example, link element $802_8$ of FIG. 11) located at the second end of the scissoring rib assembly during pivotal motion of the third link element; and using the edge member to cause vertical movement of a peripheral edge (for example, peripheral edge 144 of FIG. 1) of a reflector (for example, reflector 106 of FIG. 1) relative to the hub while the edge member slidingly engages the fourth link element. The expansion of the scissoring rib assembly and vertical movement of the peripheral edge of the reflector provides an antenna reflector surface (for example, surface 108 of FIG. 1) with a curved shape (for example, a generally parabolic shape).

In 1516, expansion of the scissoring rib assembly is restrained using a plurality of cords coupled between the hub and the scissoring rib assembly. The cords comprise tower cord(s) (for example, tower cord 118 of FIG. 1) coupled between the hub and edge member(s) and/or scissor hinge cord(s) (for example, scissor hinge cord(s) of 120 FIG. 1) coupled between the hub and hinge(s) of the scissoring rib assembly(ies).

In 1518, the reflector surface is structurally supported using a circumferential hoop (for example, circumferential hoop assembly 160 of FIG. 1). The hoop is at least partially defined by the edge member and a plurality of cords (for example, cords 122, 124, 126, 126A, 126B of FIG. 1). The cords extend between the edge member of the scissoring rib assembly and an edge member of at least one other scissoring rib assembly. The antenna reflector surface is held taut when the scissoring rib assembly is in an expanded position (for example, shown in FIG. 1). Subsequently, 1520 is performed where method 1500 ends or other operations are performed.

A first distance (for example, distance 1200 of FIG. 12) between the proximal end of the first link element and the proximal end of the second link element (i) decreases as the scissoring rib assembly transitions from a collapsed position to an expanded position and (ii) increases as the scissoring rib assembly transitions from the expanded position to the collapsed position. Similarly, a second distance (for example, distance 1212 of FIG. 12) between the distal end of the third link element and a distal end of the fourth link element (i) decreases as the scissoring rib assembly transitions from the collapsed position to the expanded position and (ii) increases as the scissoring rib assembly transitions from the expanded position to the collapsed position. A distance (for example, distance 1204 of FIG. 12) between an end of the edge member which is coupled to the reflector and an end of the hub which is closest to the reflector is (i) increased as the scissoring rib assembly transitions from the collapsed position to the expanded position and (ii) decreased as the scissoring rib assembly transitions from the expanded position to the collapsed position.

The present solution is not limited to the architecture of the deployable reflector system shown in FIGS. 1-13. Another architecture for a deployable reflector system is shown in FIGS. 16-19. The deployable reflector system 1600 is shown in FIGS. 16-19 without the reflector surface for ease of illustration. The deployable reflector system 1600 is similar to the deployable reflector system 100 discussed above except for the edge member arrangement. In the deployable reflector system 100, the edge member 128 remains generally parallel to the hub 114 when the scissoring rib assemblies 102 are in the expanded states. This is at least partially facilitated by a sliding joint 1108 between the edge member 128 and the scissoring rib assembly.

As shown in FIGS. 16-19, the lifting mechanism for the reflector surface is facilitated by a linkage between the distal link ends of the last section 1102 and 1108 of FIGS. 11 to 1604 which is(are) coupled to the scissoring rib assembly (ies) 1602 without the use of sliding joints. Pivoting joints 1700 are used instead of the sliding joints. In the collapsed state shown in FIG. 16, the edge member(s) 1604 are generally parallel with the hub (not visible in FIGS. 16-19) and link elements 1606 of the scissoring rib assembly(ies) 1602. In partially and fully expanded states shown in FIG. 17, the edge member(s) 1604 of the scissoring rib assembly (ies) 1602 are angled or otherwise tilted relative to the hub rather than generally parallel with the hub. The angle or amount of tilt of each edge member 1604 can remain the same as the scissoring rib assembly is being expanded (not shown) or change as the scissoring rib assembly is being expanded (shown in FIG. 17).

Figure 18:
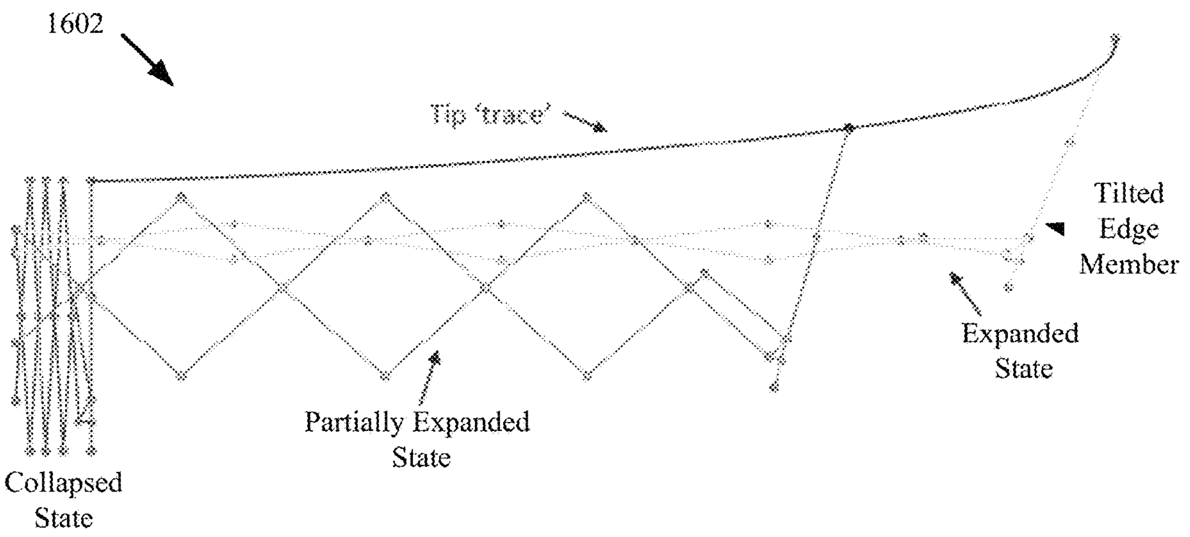
Figure 19:
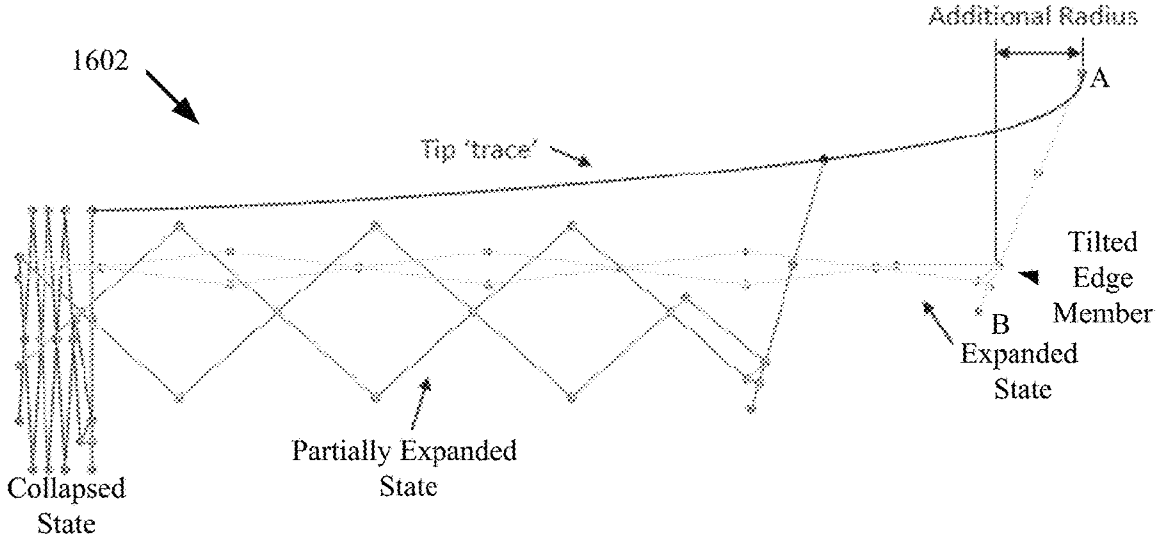

Kinematic representations of the scissoring rib assembly 1602 are provided in FIG. 18. FIG. 18 highlights the following additional aspects of this arrangement: elimination of the sliding joint; capability to define a non-vertical edge element; and no or a minimal amount of over-stretch of the tip during expansion of the scissoring rib assembly (as illustrated by the tip trace line of FIG. 18).

The arrangement of FIGS. 16-19 has many advantages. For example, the arrangement has an increased reliability over the sliding joint arrangement. Friction in a vacuum (or any other) environment can create binding forces that are detrimental to reliable, repeatable deployment required for high precision structures. The links decrease this binding potential. The linkage offers the advantage to increase the radius (diameter) of the structure without increasing the length of all the link elements (subsequently reducing stowed height) as highlighted. Through judicious selection of the kinematic geometry, the tilted edge member offers additional diameter to the structure without increase in stowed height (more compact packaging).

The linkage offers the ability to maintain 'zero over-stretch' of surface elements of the reflector (a quality the sliding joint also offers). Over-stretch simply is the definition of how much the surface elements (attaching to the tips of the rib or edge member at points A and B shown in FIG. 19) must stretch beyond their final, deployed dimensions due to the kinematic behavior of the deploying rib. Over-stretch of surface elements create stress in the surface elements larger than their fully deployed stress. If the surface elements are perfectly elastic, then over-stretch is not so much an issue. However, in a cord and mesh reflector, these elements are not perfectly elastic and thus, when over-stretched, do not necessarily return to their ideal, design length and/or stress. Consequently, eliminating over-stretch (as the sliding joint provides) is desirable for the linkage design.

Linkage shown virtually eliminates over-stretch thereby maintaining a major feature of the sliding joint without the drawbacks of binding potential. The linkage also provides the capability to add deployed diameter (noted in FIG. 19 as Additional Radius) to a structure of fixed stowed height.

Reference throughout this specification to features, advantages, or similar language does not imply that all features and advantages that may be realized should be or are in any single embodiment. Rather, language referring to the features and advantages is understood to mean that a specific feature, advantage, or characteristic described in connection with a particular implementation is included in at least one embodiment. Thus, discussions of the features and advantages, and similar language, throughout the specification may, but do not necessarily, refer to the same embodiment.

Furthermore, the described features, advantages and characteristics disclosed herein may be combined in any suitable manner. One skilled in the relevant art will recognize, in light of the description herein, that the disclosed systems and/or methods can be practiced without one or more of the specific features. In other instances, additional features and advantages may be recognized in certain scenarios that may not be present in all instances.

Reference throughout this specification to "one embodiment", "an embodiment", or similar language means that a particular feature, structure, or characteristic described in connection with the indicated embodiment is included in at least one embodiment. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Although the systems and methods have been illustrated and described with respect to one or more implementations, equivalent alterations and modifications will occur to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application. Thus, the breadth and scope of the disclosure herein should not be limited by any of the above descriptions. Rather, the scope of the invention should be defined in accordance with the following claims and their equivalents.

I claim:

1. A deployable reflector system, comprising:

a hub;

at least one edge member;

at least one scissoring rib assembly having a first end coupled to the hub and a second end coupled to the edge member;

a reflector surface secured to the at least one edge member and expandable to a shape that is configured to concentrate RF energy in a desired pattern; and an actuator disposed at the hub and configured to cause scissor motion of the at least one scissoring rib assembly;

wherein the at least one scissoring rib assembly comprises a first link element with a proximal end that slidingly engages the hub, a second link element with a proximal end pivotally coupled to the hub, pivotal movement of the second link element being caused by sliding movement of the first link element relative to the hub, a third link element with a distal end pivotally coupled to the edge member, pivotal movement of the third link element occurs at least during the scissor motion of the at least one scissoring rib assembly, and a fourth link element having a proximal end that slidingly engages the edge member during pivotal motion of the third link element so as to provide a variable distance between the proximal end of the fourth link element and an end of the edge member which is closest to the reflector surface; and wherein vertical movement of a peripheral edge of the reflector surface relative to the hub is caused by the edge member while the edge member slidingly engages the fourth link element; and wherein an elongate central axis of the at least one scissor rib assembly linearly extends perpendicular to the hub when the at least one scissoring rib assembly is in an expanded condition and when the at least one scissoring rib assembly is in a collapsed condition.

2. The deployable reflector system according to claim 1, wherein expansion of the at least one scissoring rib assembly and vertical movement of the peripheral edge of the reflector surface provides the reflector surface with a curved shape.

3. The deployable reflector system according to claim 1, wherein the reflector surface is held taut when the at least one scissoring rib assembly is in an expanded condition.

4. The deployable reflector system according to claim 1, wherein a first distance between the proximal end of a first link element and the proximal end of the second link element decreases as the at least one scissoring rib assembly transitions from a collapsed condition to an expanded condition.

5. The deployable reflector system according to claim 4, wherein a second distance between the distal end of the third link element and a distal end of the fourth link element decreases as the at least one scissoring rib assembly transitions from the collapsed condition to the expanded condition.

6. The deployable reflector system according to claim 1, wherein a distance between the end of the edge member and an end of the hub which is closest to the reflector surface is increased as the at least one scissoring rib assembly transitions from the collapsed condition to the expanded condition.

7. The deployable reflector system according to claim 1, further comprising a circumferential hoop structurally supporting the reflector surface when the deployable reflector system is in deployed condition, the circumferential hoop at least partially defined by the edge member and a plurality of cords extending between the edge member of the at least one scissoring rib assembly and an edge member of at least one other scissoring rib assembly.

8. The deployable reflector system according to claim 1, further comprising a plurality of cords to restrain expansion of the at least one scissoring rib assembly, the plurality of cords coupled between the hub and the at least one scissoring rib assembly.

9. The deployable reflector system according to claim 8, wherein the plurality of cords comprise at least one tower cord coupled between the hub and the edge member.

10. The deployable reflector system according to claim 8, wherein the plurality of cords comprise at least one scissor hinge cord coupled between the hub and a hinge of the scissoring rib assembly.

* * * * *